(12) United States Patent
Kondo et al.

(10) Patent No.: US 8,428,838 B2
(45) Date of Patent: Apr. 23, 2013

(54) DRIVING-FORCE TRANSMITTING APPARATUS FOR FOUR-WHEEL-DRIVE VEHICLE

(75) Inventors: Hiroyuki Kondo, Kosai (JP); Yosuke Masuda, Kosai (JP); Kengo Yokota, Kosai (JP); Hedeto Noyori, Kosai (JP); Noriatsu Yano, Kosai (JP)

(73) Assignee: Univance Corporation, Shizuoka (JP)

( * ) Notice: Subject to any disclaimer, the term of this patent is extended or adjusted under 35 U.S.C. 154(b) by 382 days.

(21) Appl. No.: 12/762,581

(22) Filed: Apr. 19, 2010

(65) Prior Publication Data
US 2010/0274456 A1 Oct. 28, 2010

(30) Foreign Application Priority Data

Apr. 23, 2009 (JP) ................. 2009-104752
Apr. 30, 2009 (JP) ................. 2009-110578

(51) Int. Cl.
G06F 7/00 (2006.01)
(52) U.S. Cl.
USPC ............................................. 701/69
(58) Field of Classification Search .................. None
See application file for complete search history.

(56) References Cited

U.S. PATENT DOCUMENTS

| 7,905,312 B2* | 3/2011 | Kato et al. ............ 180/249 |
| 2002/0109402 A1* | 8/2002 | Nakamura ............ 303/146 |
| 2002/0124686 A1* | 9/2002 | Ohtani et al. ............ 74/665 F |
| 2004/0140174 A1* | 7/2004 | Kano et al. ............ 192/104 R |
| 2006/0030974 A1* | 2/2006 | Tsukasaki et al. ............ 701/1 |
| 2007/0213162 A1* | 9/2007 | Takasaki ............ 475/5 |

FOREIGN PATENT DOCUMENTS

| JP | 01-148627 | 6/1989 |
| JP | 02-081726 | 3/1990 |
| JP | 5-71027 | 9/1993 |
| JP | 10-331869 | 12/1998 |
| JP | 11-125279 | 5/1999 |
| JP | 2000-190753 | 7/2000 |
| JP | 2002-370557 | 12/2002 |
| JP | 2003-013996 | 1/2003 |
| JP | 2004-009954 | 1/2004 |
| JP | 2008-114674 | 5/2008 |

OTHER PUBLICATIONS

Japanese Office Action issued Aug. 28, 2012 in Japanese Application No. 2009-104752 with partial English translation.

* cited by examiner

Primary Examiner — Thomas Tarcza
Assistant Examiner — Adam Alharbi
(74) Attorney, Agent, or Firm — Wenderoth, Lind & Ponack, L.L.P.

(57) ABSTRACT

A transmitting apparatus includes a disengaging device that disengages a driving force from a front-wheel differential device to a first driving-force transmitting direction converting unit and a multi-plate clutch mechanism provided between an output of a rear-wheel differential device and a right-rear wheel and capable of successively adjusting a fastening force. Drag torque when the fastening of the multi-plate clutch mechanism is released is set smaller than friction torque of a rear-wheel drive system between the first driving-force transmitting direction converting unit and a second driving-force transmitting direction converting unit. A controller unconnects the disengaging device and releases the fastening of multi-plate clutch mechanism when switching to a two-wheel drive mode, thereby stopping the rotation of the rear-wheel drive system.

20 Claims, 28 Drawing Sheets

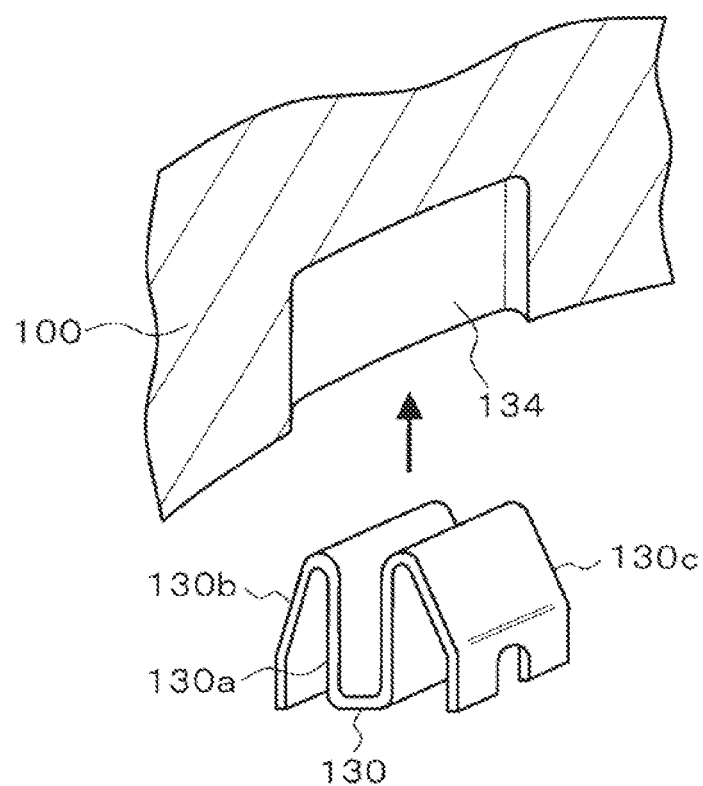

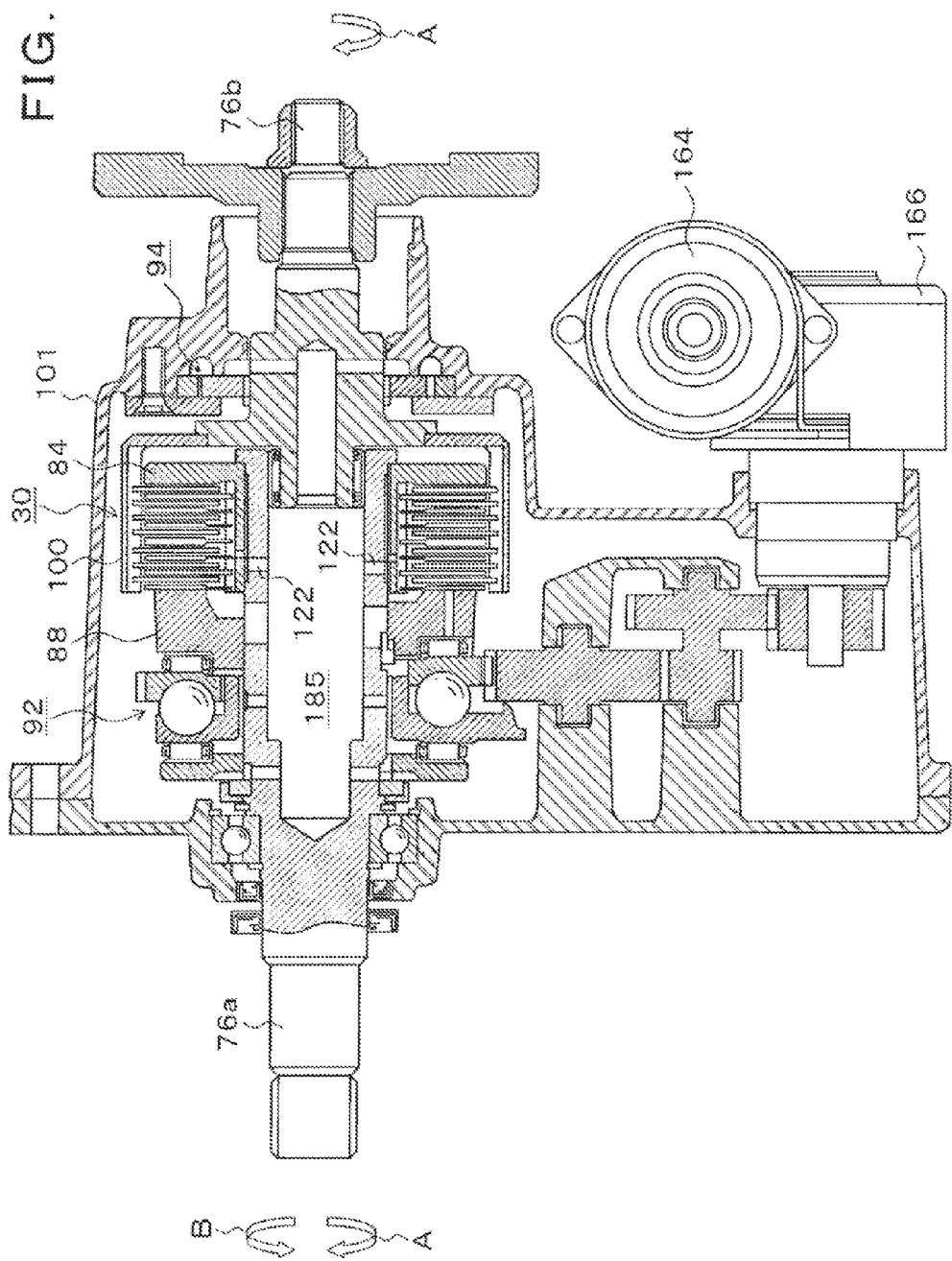

DRIVING-FORCE TRANSMITTING APPARATUS FOR FOUR-WHEEL-DRIVE VEHICLE

This application is a priority based on prior application No. JP 2009-104752, filed Apr. 23, 2009 and No. JP 2009-110578, filed Apr. 30, 2009, in Japan.

BACKGROUND OF THE INVENTION

1. Field of the Invention

The present invention relates to driving-force transmitting apparatuses for four-wheel-drive vehicles capable of switching between two-wheel drive and four-wheel drive and, in particular, a driving-force transmitting apparatus for a four-wheel-drive vehicle stopping the rotation of a portion not associated with transmission of a driving force in two-wheel drive.

2. Description of the Related Arts

In a conventional so-called on-demand-type full-time four-wheel-drive vehicle, as an example of a driving-force transmitting apparatus for a four-wheel-drive vehicle in which front wheels are driven in two-wheel drive and distribution of a driving force to rear wheels is controlled by a driving-force distributing device in four-wheel drive, an apparatus shown in FIG. 1 is known.

In FIG. 1, a driving-force transmitting apparatus 300 is provided in a four-wheel-drive vehicle 302, the speed of a driving force from an engine 304 is changed by a change gear 306 for input to a front-wheel differential device 308 and a driving-force direction converting unit 310 in the driving-force transmitting apparatus 300, and an output from the driving-force direction converting unit 310 is transmitted via a propeller shaft 312 to a driving-force distributing device 314 known as an electronic-control-type coupling device. In two-wheel drive, when the driving-force distributing device 314 is released (in a disconnected state), the driving force is not distributed to a rear-wheel differential device 326 but is transmitted to the front-wheel differential device 308. While absorbing a difference in rotation speed between a left-front wheel 318 and a right front wheel 320, the front-wheel differential device 308 provides the same torque to the left-front wheel 318 and the right-front wheel 320 for rotation. When the driving-force distributing device 314 is fastened (in a connected state) in four-wheel drive, the driving force is transmitted also to the rear-wheel differential device 326 via a drive pinion 320 and a ring gear 321 coupled to the driving-force distributing device 314. While absorbing a difference in rotation speed between a left-rear wheel 322 and a right-rear wheel 324, the rear-wheel differential device 326 provides the same torque to the left-rear wheel 322 and the right-rear wheel 324. In general, the on-demand-type full-time four-wheel-drive vehicle is provided with a two-wheel drive mode, a four-wheel drive auto mode, and a four-wheel-drive lock mode as drive modes selectable by a driver with a switch operation while driving. The two-wheel drive mode is a mode in which the driving-force distributing device 314 of the driving-force transmitting apparatus 300 is released for use in a two-wheel drive state, and is selected, because of the highest fuel efficiency, in the case of running on a road not requiring a driving force by four wheels, such as a dry pavement. The four-wheel drive auto mode is a mode in which various vehicle states during running are detected by a sensor and, based on the detection signal, distribution of a driving force by the driving-force distributing device 314 to front and rear wheels is automatically controlled by an ECU (Electronic control unit) so as to be in an optimum state, and this mode represents four-wheel drive that can always be selected irrespectively of a road surface state. In this mode, the fastening force of the driving-force distributing device 314 is successively increased and decreased by an actuator, and distribution of the driving force to the front and rear wheels is controlled between a two-wheel drive state, in which the driving force to the rear wheels is approximately zero, and a maximum fastening force. The four-wheel drive lock mode is a mode in which the driving-force distributing device 314 is held at the maximum fastening force irrespectively of the vehicle state detected by various sensors, and is selected when the ability of running through as a four-wheel-drive vehicle is desired to be maximized on a bad road or the like. However, in the conventional driving-force transmitting apparatus for four-wheel-drive vehicle depicted in FIG. 1, even in the two-wheel drive mode in which the driving-force distributing device 314 is released, the driving force from the change gear 306 rotates a drive side (front-wheel side) of the driving-force direction converting unit 310, the propeller shaft 312, and the driving-force distributing device 314. That is, even in two-wheel drive in which the driving force is not transmitted to the rear wheels with the driving-force distributing device 314 being released, each component of a rear-wheel driving-force system including the driving-force direction converting unit 310, the propeller shaft 312, the driving-force distributing device 314, the drive pinion 320, and the rear-wheel differential device 326 disadvantageously rotates to invite a decrease in fuel efficiency due to resistance to agitation of oil in this rear-wheel driving-force system, friction loss of a bearing portion, and other factors. At the same time, even in the two-wheel drive mode in which the driving-force distributing device 314 is released, the left-rear wheel 322 and the right-rear wheel 324 and the rear-wheel differential device 326 are directly connected together and, therefore, with the left-rear wheel 322 and the right-rear wheel 324 being rotated, a rear-wheel driving transmitting system as a driven side (rear-wheel side) of the rear-wheel differential device 326, the drive pinion 320, and the driving-force distributing device 314 rotates. Also, the driving-force distributing device 314 disengages the driving force and controls a transmission torque by a multi-plate clutch mechanism, with a plurality of clutch plates being lubricated and cooled with oil. Even in a clutch-disconnected state, since a so-called drag torque occurring because of viscous drag of oil occurring due to a difference in rotation speed between a drive side and a driven side of the clutch plates and also because of friction loss due to a contact among clutch plates is larger than a friction torque of the drive pinion 320 and the rear-wheel differential device 326, the drive pinion 320 and the rear-wheel differential device 326 are disadvantageously rotated from a driving-force distributing device 314 side, thereby deteriorating fuel efficiency. To decrease this drag torque, supply of oil to the multi-plate clutch mechanism of the driving-force distributing device 314 is stopped, or the device is used in a state where the amount of oil is decreased to an extreme. With this, the drag torque occurring due to viscous drag of oil can be decreased or eliminated. However, in driving-force distribution control, the multi-plate clutch mechanism may be seized up unless sufficient lubrication is provided. Moreover, to decrease drag torque, a method of widening the space between clutches can be taken. However, clutch-fastened responsiveness is disadvantageously deteriorated. On the other hand, conventionally, in an FF-vehicle-base four-wheel-drive vehicle, for example, as depicted in FIG. 2, a driving-force transmitting apparatus has been suggested in which switching is performed between two-wheel drive and four-wheel drive by an engaging clutch on a transfer case.

In FIG. 2, a driving-force transmitting apparatus 300 is provided on a four-wheel-drive vehicle 302, and the speed of a driving force from the engine 304 is changed by a change gear 306 for input to a front-wheel differential device 308 and a driving-force distributing device 328 that is provided to a driving-force transmitting direction converting unit 310 in the driving-force transmitting apparatus 300. A driving-force distributing device 328 has an engaging clutch mechanism incorporated therein, with a clutch gear being disposed on a front-wheel differential device 308 side and a coupling gear and a coupling sleeve disposed on a rear-wheel propeller shaft 314 side. With the operation of a shifting fork by an actuator using a motor, switching is performed between a two-wheel-drive position at which the coupling sleeve is removed from the clutch gear and a four-wheel-drive position at which the coupling sleeve is engaged with the clutch gear. In two-wheel drive, the coupling sleeve is disconnected from the clutch gear of a driving-force distributing device 328. The driving force is transmitted only to the front-wheel differential device 308. While absorbing a difference in rotation speed between a left-front wheel 318 and a right-front wheel 320, the front-wheel differential device 308 provides the same torque to the left-front wheel 318 and the right-front wheel 320 for rotation. In four-wheel drive, the coupling sleeve is engaged with the clutch gear of the driving-force distributing device 328. The driving force is transmitted from the driving-force distributing device 328 via the rear-wheel propeller shaft 314 also to the rear-wheel differential device 326. While absorbing a difference in rotation speed between the left-rear wheel 322 and the right-rear wheel 324, the rear-wheel differential device 326 provides the same torque to the left-rear wheel 322 and the right-rear wheel 324 for rotation. Still further, as an FF-vehicle-base four-wheel-drive vehicle, as depicted in FIG. 3, a driving-force transmitting apparatus with an electronic-control coupling device 330 provided at a stage preceding to the rear-wheel differential device 326 has also been suggested. The electronic-control coupling device 330 can control a torque to be between a predetermined maximum torque and zero, the torque to be transmitted to the left-rear wheel 322 and the right-rear wheel 324 via the rear-wheel differential device 326 with a control signal from a controller. Therefore, in two-wheel drive, the transmission torque of the electronic-control coupling device 330 is controlled at zero, and the driving force is transmitted only to the front-wheel differential device 308. While absorbing a difference in rotation speed between the left-front wheel 318 and the right-front wheel 320, the front-wheel differential device 308 provides the same torque to the left-front wheel 318 and the right-front wheel 320 for rotation. In four-wheel drive, the transmission torque of the electronic-control coupling device 330 is controlled at an appropriate torque according to the running state of the vehicle, and the driving force is transmitted from the rear-wheel propeller shaft 314 via the electronic-control coupling device 330 also to the rear-wheel differential device 326. While absorbing a difference in rotation speed between the left-rear wheel 322 and the right-rear wheel 324, the rear-wheel differential device 326 provides the same torque to the left-rear wheel 322 and the right-rear wheel 324 for rotation. However, the above-described driving-force transmitting apparatus provided to an FF-vehicle-base four-wheel-drive vehicle has the following problems. First, in the driving-force transmitting apparatus of FIG. 2, even at the time of switching to two-wheel drive, transmission of the driving force is disconnected by the driving-force distributing device 328. However, with the rotation of the right-rear wheel 324 and the left-rear wheel 322, a transmission route for transmitting the driving force to the rear wheels including the rear-wheel propeller shaft 314 and the rear-wheel differential device 326 always rotates to cause friction loss due to agitation of oil and friction of a bearing portion, and other factors, thereby disadvantageously deteriorating fuel efficiency. Furthermore, with the disconnection and engagement of the coupling sleeve with respect to the clutch gear of the driving-force distributing device 328, the driving force is disengaged. Therefore, the coupling sleeve is required to be disconnected by the actuator driven by the motor when the load is small, such as when an accelerator is weakened. On the other hand, the coupling sleeve is connected to the clutch gear with the actuator by engagement with the timing when the front wheels and the rear wheels match each other in rotation. In this case, if the coupling sleeve is pressed onto an end face of the clutch gear with the force of the motor to wait for the timing when the rotation of the front wheels and the rotation of the rear wheels match each other, the load becomes too large, and therefore a wait mechanism with springs at both ends is required. However, an actuator having a wait mechanism with springs provided at both ends has a complex structure, large size, and high cost, and installation in the vehicle is restricted. Still further, in the driving-force transmitting apparatus 300 using the electronic control coupling device 330 of FIG. 3, two-wheel drive can be performed by setting the transmission torque to the electronic-control coupling device 330 at zero. However, as with the case of FIG. 2, a transmission route for transmitting the driving force to the rear wheels including the rear-wheel propeller shaft 314 and the rear-wheel differential device 326 always rotates to cause friction loss due to agitation of oil and friction of a bearing portion, and other factors, thereby disadvantageously deteriorating fuel efficiency.

SUMMARY OF THE INVENTION

According to the present invention, a driving-force transmitting apparatus for a four-wheel-drive vehicle is provided for achieving a decrease in fuel efficiency by reliably stopping the rotation of a rear-wheel drive system in a two-wheel drive mode to decrease oil viscous drag and friction loss.

In the present invention, in a driving-force transmitting apparatus for a four-wheel-drive vehicle capable of switching between a four-wheel drive mode in which distribution of a driving force to be transmitted to front wheels and rear wheels is automatically controlled according to a running condition and a two-wheel drive mode in which the driving force is transmitted only to the front wheels, the driving-force transmitting apparatus for a four-wheel-drive vehicle includes:

a front-wheel-purpose differential device that, upon receiving a driving force from an engine, distributes the driving force to left and right front wheels;

a first driving-force transmitting direction converting unit that changes a rotating direction of the driving force from the engine for transmission to the rear wheels;

a second driving-force transmitting direction converting unit that, upon receiving the driving force from the first driving-force transmitting direction converting unit, changes a rotating direction for transmission to a rear-wheel differential device;

the rear-wheel-purpose differential device that distributes the driving force to left and right rear wheels;

a disengaging device that disengages the driving force to the first driving-force transmitting direction converting unit;

a multi-clutch mechanism provided between one of outputs of the rear-wheel differential device and one of the left and right rear wheels, the mechanism capable of successively adjusting a fastening force;

a drag-torque decreasing mechanism that sets drag torque when fastening of the multi-plate clutch mechanism is released smaller than friction torque between the first driving-force transmitting direction converting unit and the second driving-force transmitting direction converting unit; and a controller that unconnects the disengaging device and releases the fastening of the multi-plate clutch mechanism in the two-wheel drive mode to stop rotation of the second driving-force transmitting direction converting unit from the first driving-force transmitting direction converting unit, and connects the disengaging device and adjusts the fastening force of the multi-plate clutch mechanism according to the running condition of the vehicle in the four-wheel drive mode.

Here, the drag-torque decreasing mechanism has a structure in which the rear-wheel differential device and the multi-plate clutch mechanism are separated from each other as different rooms so that lubricating oil of the rear-wheel differential device and lubricating oil of the multi-plate clutch mechanism do not mix together.

The drag-torque decreasing mechanism includes a lubricating-oil supply mechanism that sets a space between clutch plates wider than a predetermined value and stops or restricts supply of lubricating oil to the clutch plates in the two-wheel drive mode where the multi-plate clutch mechanism is disconnected and that supplies lubricating oil to the clutch plates in the four-wheel drive mode where the multi-plate clutch mechanism is fastened.

The lubricating-oil supply mechanism is provided with an oil pump that rotates in reverse in the two-wheel drive mode and that is driven by an output shaft of the rear-wheel differential device that rotates forward in the four-wheel drive mode.

The oil pump is a gear pump, and an anti-seizing processed layer is formed on a sliding contact surface with a housing of the gear pump.

The oil pump is driven via a one-way clutch provided in a space with the output shaft of the rear-wheel differential device, and in the two-wheel drive mode, the one-way clutch is idled to stop supply of the lubricating oil to the multi-plate clutch mechanism and, in the four-wheel drive mode, the oil pump is rotated forward to supply the lubricating oil to the multi-plate clutch mechanism.

The lubricating-oil supply mechanism includes an oil pump that is driven by an output shaft of the rear-wheel differential device that rotates in reverse in the two-wheel drive mode and rotates forward in the four-wheel drive mode;

a first suction-path check valve that causes the oil pump to suck oil from a first suction path at the time of reverse rotation in the two-wheel drive mode;

a first discharge-path check valve that causes the oil discharged from the oil pump to be discharged to a region other than the multi-plate clutch mechanism at the time of reverse rotation in the two-wheel drive mode;

a second suction-path check valve that causes the oil pump to suck oil from a second suction path at the time of forward rotation in the four-wheel drive mode; and a second discharge-path check valve that causes the oil discharged from the oil pump to be discharged to the multi-plate clutch mechanism at the time of forward rotation in the four-wheel drive mode.

The lubricating-oil supply mechanism includes an oil pump that is driven by an output shaft of the rear-wheel differential device that rotates in reverse in the two-wheel drive mode and rotates forward in the four-wheel drive mode;

a suction-path check valve that causes the oil pump to suck oil from a first suction path for discharge to a tank through a discharge and suction path at the time of reverse rotation in the two-wheel drive mode; and a discharge-path check valve that causes the oil sucked into the oil pump from the dual-purpose discharge and suction path to be discharged to the multi-plate clutch mechanism at the time of forward rotation in the four-wheel drive mode.

The lubricating-oil supply mechanism includes an oil pump that is driven on an output side of the multi-plate clutch mechanism; and an opening and closing mechanism that closes a lubricating route in the two-wheel drive mode to stop supply of the lubricating oil and opens the lubricating route to supply the lubricating oil in the four-wheel drive mode.

The opening and closing mechanism includes a valve chamber formed in an internal axial direction of an output shaft from the rear-wheel differential device having the multi-plate clutch mechanism and supplied with the lubricating oil from the oil pump;

a valve member slidably accommodated in the valve chamber and moving in synchronization with a piston movable in an axial direction and disengaging the clutch plates of the multi-plate clutch mechanism; and an oil supply hole for supplying the lubricating oil between the clutch plates of the multi-plate clutch mechanism, wherein the opening and closing mechanism cuts off the lubricating oil by closing the oil supply hole with the movement of the valve member in synchronization with a movement of the piston to a clutch-unfastened position in the two-wheel drive mode, and opens the oil supply hole to supply the lubricating oil with a movement of the valve member in synchronization with a movement of the piston to a clutch-fastened position in the four-wheel drive mode.

The opening and closing mechanism includes an oil chamber formed in an inner axial direction of an output shaft of the rear-wheel differential device where the multi-clutch mechanism is disposed, the oil chamber to which the lubricating oil from the oil pump is supplied;

an outer-perimeter spline with a valley portion wider than a ridge portion formed on an outer perimeter of the output shaft;

an inner hub of the multi-plate clutch mechanism, the inner hub having an inner-perimeter spline formed with a valley portion wider than a ridge portion fitting in the outer-perimeter spline of the output shaft; and a pair of oil supply holes that cuts off the lubricating oil to the multi-plate clutch mechanism at a position where the outer-perimeter spline abuts on the inner-perimeter spline with reverse rotation of the output shaft in the two-wheel drive mode and that supplies the lubricating oil to the multi-plate clutch mechanism at a position where the outer-perimeter spline abuts on the inner-perimeter spline with forward rotation of the output shaft in the four-wheel drive mode, the oil supply holes formed in the valley portions of the outer-perimeter spline and the inner-perimeter spline.

The drag-torque decreasing mechanism includes a spring member for pressing in a direction of widening a space between the clutch plates.

The drag-torque decreasing mechanism includes a spring member in a space formed with a piston pressing the clutch plates, the spring member for pressing in a direction of widening the space therebetween.

The Controller fastens the disengaging device after fastening the multi-plate clutch mechanism in switching from the two-wheel drive mode to the four-wheel drive mode, and unconnects the disengaging device after releasing the multi-plate clutch mechanism when switching is made from the four-wheel drive mode to the two-wheel drive mode.

According to the present invention, a disengaging device is provided on the output shaft from the front-wheel differential device to the rear-wheel drive system. Also, on any one of the rear-wheel driving shafts of the rear-wheel differential device, a multi-plate clutch mechanism functioning as a driving-force distributing device is provided, and drag torque due to friction when the fastening of the multi-plate clutch mechanism is released in the two-wheel drive mode is decreased to approximately zero. With this, it is possible to appropriately achieve a function of distributing the driving force to the front and rear wheels in the four-wheel drive mode, a function of completely stopping the rotation of the rear-wheel drive system from the first driving-force transmitting direction converting unit on an output side of the disengaging device to the second driving-force transmitting direction converting unit on an input side of the rear-wheel differential device in the two-wheel drive mode and, furthermore, a function of increasing the rotation of the rear-wheel drive system that has completely stopped when switching is made from the two-wheel drive mode to the four-wheel drive mode while running to connect the disengaging device for synchronization.

Also, for stopping the rotation of the rear-wheel drive system in the two-wheel drive mode, the multi-plate clutch mechanism can be provided in a space formed with the second driving-force transmitting direction converting unit on an input side of the rear-wheel differential device. However, the conventional rear-wheel differential device cannot be used as it is, thereby making the structure complex and leading to upsizing and heavy weight with a large capacity of the clutch torque and also an increase in cost. In the present invention, with the multi-plate clutch mechanism being provided on the rear-wheel driving shaft between the rear-wheel differential device and a rear wheel, the clutch capacity can be ½, the conventional rear-wheel differential device can be used as it is, and downsizing, light weight, and low cost of the multi-plate clutch mechanism can be achieved.

Furthermore, since the rear-wheel drive system becomes in a full stop state in the two-wheel drive mode, no friction loss occurs, deterioration in fuel efficiency can be prevented, and fuel efficiency when use in the two-wheel drive mode despite a four-wheel-drive vehicle can be at the same level of fuel efficiency of a two-wheel-drive vehicle.

Still further, with the supply of lubricating oil to the multi-plate clutch mechanism is stopped in the two-wheel drive mode, drag torque occurring due to agitation of lubricating oil by the clutch plates in a disconnected state can be significantly decreased, thereby reliably allowing the rotation of the rear-wheel drive system to be stopped.

According to the present invention, a driving-force transmitting apparatus for a four-wheel-drive vehicle is provided that decreases friction loss from a rear-wheel drive system in two-wheel drive and achieves an FF-vehicle-based four-wheel-drive vehicle with high fuel efficiency.

In the present invention, in a driving-force transmitting apparatus for a four-wheel-drive vehicle capable of switching between a four-wheel drive mode in which a driving force is transmitted to front wheels and rear wheels and a two-wheel drive mode in which the driving force is transmitted only to the front wheels, the driving-force transmitting apparatus for a four-wheel-drive vehicle includes:

a front-wheel-purpose differential mechanism that, upon receiving a driving force from an engine, distributes the driving force to left and right front wheels;

a first driving-force transmitting direction converting unit that changes a rotating direction of the driving force from the engine for transmission to the rear wheels;

a rear-wheel-purpose differential mechanism that distributes the driving force to left and right rear wheels;

a second driving-force transmitting direction converting unit that, upon receiving the driving force from the first driving-force transmitting direction converting unit, changes a rotating direction for transmission to a rear-wheel-purpose differential mechanism;

a first disengaging mechanism that disengages the driving force to the first driving-force transmitting direction converting unit;

a second disengaging mechanism provided at least one of a space between the rear-wheel differential mechanism and a rear-wheel left shaft and a space between the rear-wheel differential mechanism and a rear-wheel right shaft to disengage the driving force; and a controller that unconnects the second disengaging mechanism and then releases the connection of the first disengaging mechanism when switching is made from the four-wheel drive mode to the two-wheel drive mode, and connects the second disengaging mechanism and then connects the first disengaging mechanism when switching is made from the two-wheel drive mode to the four-wheel drive mode.

Here, the first disengaging mechanism is an engaging clutch mechanism that switches, with an operation of an actuator, between connection with engagement of a coupling sleeve with a clutch gear and unconnection in which the coupling sleeve is disconnected from the clutch gear, the second disengaging mechanism is a multi-plate clutch mechanism that controls distribution of the driving force to be transmitted to the front wheels and the rear wheels by successively changing the fastening force, and when switching is made from the four-wheel drive mode to the two-wheel drive mode, the controller releases the fastening force of the multi-plate clutch mechanism of the second disengaging mechanism for unconnection, and then sets, as for the first disengaging mechanism, the engaging clutch mechanism as unconnected with an operation of the actuator and, when switching is made from the two-wheel drive mode to the four-wheel drive mode, the controller provides a fastening force to the multi-plate clutch mechanism of the second disengaging mechanism for connection and then connects the first disengaging mechanism with an operation of the actuator.

The first disengaging mechanism includes a shift rod that is moved by the actuator in a reciprocating manner in a connecting direction and unconnecting direction of the engaging clutch mechanism;

a fork provided to the shift rod to move integrally with a movement of the shift rod in a unconnecting direction and to become free with a movement of the shift rod in a connecting direction; and a spring that always presses the fork in a connecting direction, and when switching is made from the four-wheel drive mode to the two-wheel drive mode, with a movement of the rod in an unconnecting direction with an operation of the actuator, the shifting fork is integrally moved against the spring to detach the coupling sleeve of the engaging clutch mechanism from the clutch gear for releasing connection and, when switching is made from the two-wheel drive mode to the four-wheel drive mode, with the shifting force being set as free with a movement of the rod in a connecting direction with an operation of the actuator, the coupling sleeve of the engaging clutch mechanism is pressed onto an end face of the clutch gear by the spring for connection with engagement at the time of synchronization of rotation of both.

An actuator that activates the first disengaging mechanism is placed on an upper portion in an orthogonal direction of the first driving-force transmitting direction converting unit placed in the vehicle.

The driving-force transmitting apparatus for a four-wheel-drive vehicle of the present invention has a structure in which drag torque at the time of unconnection of the multi-plate clutch mechanism provided to the second disengaging mechanism is set smaller than friction torque from the first driving-force transmitting direction converting unit to the second driving-force transmitting direction converting unit.

The multi-plate clutch mechanism includes a spring member for pressing in a direction of widening a space between the clutch plates.

The multi-plate clutch mechanism includes a spring member in a space formed with a piston pressing the clutch plates, the spring member for pressing in a direction of widening a space therebetween.

The multi-plate clutch mechanism has a switching valve that operates with a movement of the piston in an axial direction, cuts off supply of oil to the clutch plates at a clutch-disconnected position where the piston is retracted, and supplies oil to the clutch plates at a clutch-fastened position where the piston advances.

According to the present invention, since the rear-wheel drive system becomes in a full stop state in the two-wheel drive mode, no friction loss occurs. Therefore, deterioration in fuel efficiency can be prevented, and fuel efficiency when use in the two-wheel drive mode despite a four-wheel-drive vehicle can be at the same level of fuel efficiency of a two-wheel-drive vehicle.

Also, when switching is made from the four-wheel drive mode to the two-wheel drive mode, after the fastening of the second disengaging mechanism provided between the rear-wheel differential device and the rear-wheel driving shaft is released, a disconnecting operation of the first disengaging mechanism provided on a side of the first driving-force transmitting direction converting unit, which transmits the driving force of the engine to the rear wheels while changing its rotating direction, is performed, thereby eliminating the driving force by the rotation of the rear wheels. With this, the torque acting on the first disengaging mechanism becomes extremely small, and the disconnecting operation of the first disengaging mechanism can be performed by the actuator. Thus, a wait mechanism is not required on a disconnection side of the first disengaging mechanism, and a simple structure with a wait mechanism only on one side, that is, a connection side, can be achieved, thereby downsizing the structure of a disengaging operation system, achieving layout flexibility, and reducing cost.

Also, since the wait mechanism can be required only on one side, that is, a connection side, is sufficient, the structure of the wait mechanism can be simplified. Therefore, it is not required to incorporate the wait mechanism in the actuator, thereby downsizing the actuator. As a result, the actuator can be placed above the driving-force distributing device having the first driving-force transmitting direction converting unit incorporated therein, thereby enhancing layout flexibility at the time of mounting on the vehicle.

BRIEF DESCRIPTION OF THE DRAWINGS

FIG. 9 is an exploded assembly view depicting a mount structure of the spring members on clutch plates of FIG. 8;

FIG. 18 is a section view depicting an embodiment of a multi-plate clutch mechanism provided with a lubricating mechanism that opens and closes a lubricating route by using a difference in rotating direction of input and output driving shafts;

DETAILED DESCRIPTION OF THE PREFERRED EMBODIMENT

Figure 4:
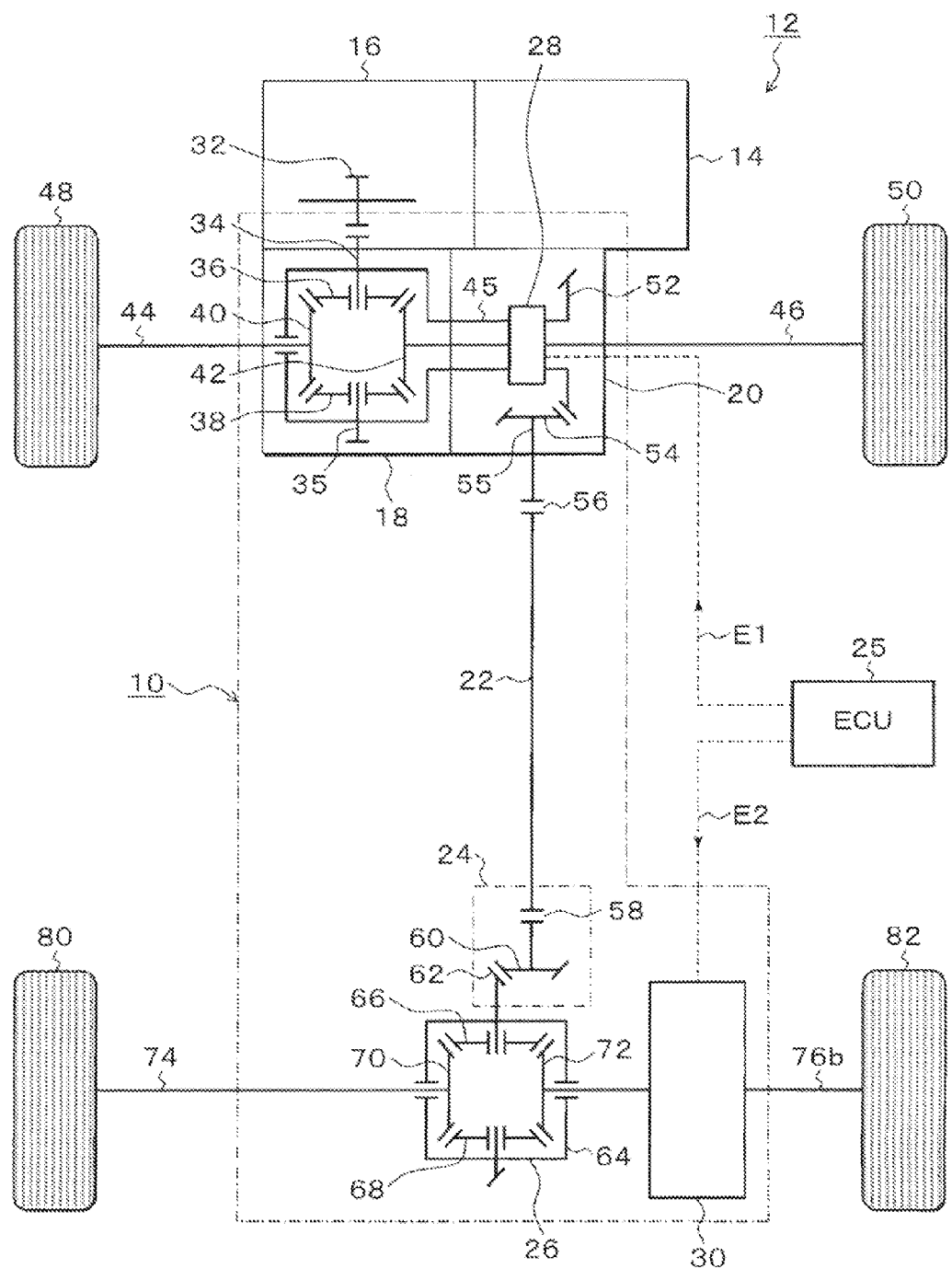
FIG. 4 is an illustrative diagram depicting, with a skeleton diagram, an embodiment of a driving-force transmitting apparatus for a four-wheel-drive vehicle according to the present invention.

FIG. 4 is an illustrative diagram depicting, with a skeleton diagram, an embodiment of a driving-force transmitting apparatus for a four-wheel-drive vehicle according to the present invention. In FIG. 4, a driving-force transmitting apparatus 10 of the present invention is mounted on an on-demand-type full-time four-wheel-drive vehicle 12, and includes a front-wheel differential device 18, a first driving-force transmitting direction converting unit 20, a propeller shaft 22, a second driving-force transmitting direction converting unit 24, and a rear-wheel differential device 26. Furthermore, a disengaging device 28 is provided between the front-wheel differential device 18 and the first driving-force transmitting direction converting unit 20, and a multi-plate clutch mechanism 30 functioning as a driving-force distributing device is provided between the rear-wheel differential device 26 and, for example, a right-rear wheel 82, that is, rear-wheel driving shafts 76a and 76b therebetween. The speed of a driving force from an engine 14 is changed by a change gear 16 for input via a drive gear 32 of the change gear 16 and a ring gear 34 of the front-wheel differential device 18 to an input driving shaft 45 of the disengaging device 28. The disengaging device 28 is unconnected (i.e., disconnected) in a two-wheel drive mode with a control signal E1 from an ECU (Electronic control unit) 25 functioning as a controller, and is connected in a four-wheel drive mode. As the disengaging device 28, for example, an engaging clutch mechanism or the like is used. The driving force from the drive gear 32 of the change gear 16 drives a left-front-wheel driving shaft 44 and a right-front-wheel driving shaft 46 via the ring gear 34 of the front-wheel differential device 18, pinions 36 and 38, and side gears 40 and 42 to rotate a left-front wheel 48 and a right-front wheel 50 for transmission of the driving force onto a road surface. Even when a difference in rotation speed occurs between the left-front wheel 48 and the right-front wheel 50 at the time of cornering or due to a change of a road surface state or the like, the front-wheel differential device 18 absorbs this difference in rotation speed, thereby making it possible to provide the same torque to the left-front wheel 48 and the right-front wheel 50 for rotation. When a driver switches to, for example, the four-wheel auto mode, with a switching operation during driving, the ECU 25 first fastens the multi-plate clutch mechanism 30 with a control signal E2, and then connects the disengaging device 28, thereby allowing the driving force to be transmitted from the disengaging device 28 to a left-rear wheel 80 and a right-rear wheel 82. In this manner, with the multi-plate clutch mechanism 30 being first fastened, the rotation of a rear-wheel drive system that stops in the two-wheel drive mode can be increased to achieve synchronization for connecting the disengaging device 28. The driving force output with the connection of the disengaging device 28 is transmitted to a bevel gear 52 of the first driving-force transmitting direction converting unit 20 to rotate an output driving shaft 55 from the bevel gear 52 via an output pinion 54. Furthermore, via a universal joint 56, the propeller shaft 22, and a universal joint 58, the driving force is transmitted from a drive pinion 60 of the second driving-force transmitting direction converting unit 24 to a ring gear 62 of the rear-wheel differential device 26 to convert the transmitting direction, and drives a left-rear-wheel driving shaft 74 and a right-rear-wheel driving shaft 76a via the ring gear 62, pinions 66 and 68, and side gears 70 and 72. At this time, since the multi-plate clutch mechanism 30 is in a fastened state, the driving force of the right-rear-wheel driving shaft 76a is transmitted to the right-rear-wheel driving shaft 76b on an output side of the multi-plate clutch mechanism 30. With this, the left-rear wheel 80 and the right-rear wheel 82 are rotated to transmit the driving force. Even when a difference in rotation speed occurs between the left-rear wheel 80 and the right-rear wheel 82 at the time of cornering or due to a change of a road surface state or the like, the rear-wheel differential device 26 absorbs this difference in rotation speed, thereby making it possible to provide the same torque to the left-rear wheel 80 and the right-rear wheel 82 for rotation. The fastening force of the multi-plate clutch mechanism 30 can be successively adjusted by a servo motor, which is clarified in description further below, with a control signal E2 from the ECU 25. With the adjustment of the fastening force according to the running condition of the vehicle, distribution of the driving force between the front and rear wheels is controlled. When switching is made from the four-wheel drive mode to the two-wheel drive mode, the ECU 25 releases the fastening force of the multi-plate clutch mechanism 30, and disconnects the disengaging device 28 to achieve an unconnected state, with the transmission of the driving force via the disengaging device 28 for a rear wheel side being eliminated. In the two-wheel drive mode, with the fastening of the multi-plate clutch mechanism 30 being released and, at the same time, the disengaging device 28 being unconnected, in the present embodiment, the rotation of the rear-wheel drive system from the first driving-force transmitting direction converting unit 20 to the second driving-force transmitting direction converting unit 24 is stopped, thereby preventing a decrease in fuel efficiency due to friction loss occurring in the two-wheel drive mode. To stop the rear-wheel drive system from the first driving-force transmitting direction converting unit 20 to the second driving-force transmitting direction converting unit 24 in the two-wheel drive mode, the multi-plate clutch mechanism 30 is required to be configured so that the drag torque when the fastening force of the multi-plate clutch mechanism 30 is released is small with respect to friction of this rear-wheel drive system. Stoppage of the rear-wheel drive system in the two-wheel drive mode is described in detail below. When the coupling of the side gear 72 of the rear-wheel differential device 26 and the right-rear-wheel driving shaft 76b are cut off by the disconnection of the multi-plate clutch mechanism 30, the rotation of the right-rear wheel 82 is not transmitted to the side gear 72, and therefore the rotation of the side gear 70 with the left-rear wheel 80 rotates the side gear 72 in a reverse direction via the pinions 66 and 68. At this time, since the rotational resistance from the drive pinion 60 leading to a ring gear 62 to the bevel gear 52 is larger than the rotational resistance of the pinions 66 and 68 and the side gear 70, the ring gear 62 does not rotate. Non-rotation of the ring gear 62 means that the rear-wheel drive system from the bevel gear 52 on an output side of the disengaging device 28 to the drive pinion 60 of the second driving-force transmitting direction converting unit 24 does not rotate. A loss of the driving force in this case occurs only at a portion where the pinions 66 and 68 and the side gear 72 rotate, thereby significantly reducing friction loss and improving fuel efficiency.

Figure 5:
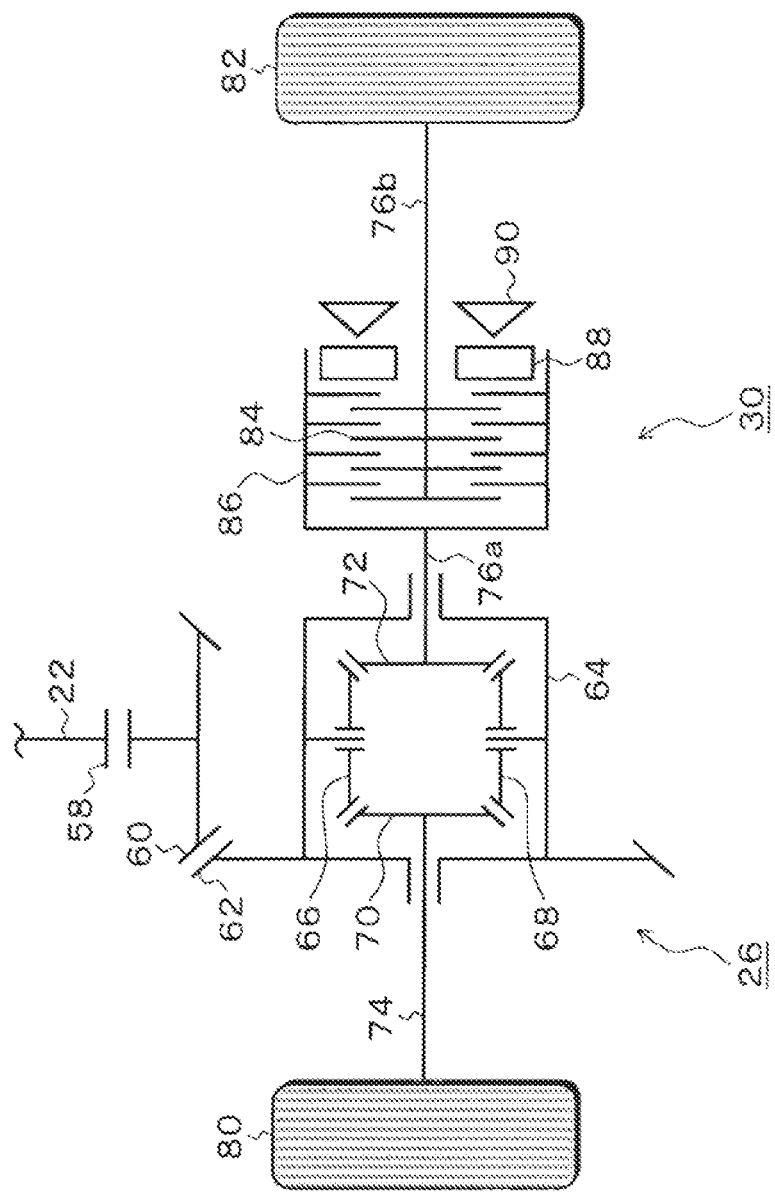
FIG. 5 is an illustrative diagram depicting, with a skeleton diagram, an embodiment of a multi-plate clutch mechanism of FIG. 4.

FIG. 5 is an illustrative diagram depicting, with a skeleton diagram, an embodiment of the multi-plate clutch mechanism 30 of FIG. 4. In FIG. 5, the multi-plate clutch mechanism 30 is placed between the right-rear-wheel driving shaft 76a coupled to the side gear 72 of the rear-wheel differential device 26 and the rear-wheel driving shaft 76b coupled to the right-rear wheel 82, and is provided on a rear-wheel driving shaft side as being separated from the rear-wheel differential device 26. Therefore, the multi-plate clutch mechanism 30 of the present embodiment can use the conventional rear-wheel differential device 26 as it is. The multi-plate clutch mechanism 30 has an outer hub 86 for receiving an input of a driving force of the right-rear-wheel driving shaft 76a from the rear-wheel differential device 26 and an inner hub 84 coupled to the rear-wheel driving shaft 76b of the right-rear wheel 82, each having clutch plates alternately disposed. On a right side of the clutch plates, a piston 88 that adjusts a clutch fastening force is disposed. The piston 88 adjusts a clutch fastening force by being pressed by an actuator 90, such as a ball cam mechanism, which will be clarified in description further below, onto a clutch plate side.

Figure 6:
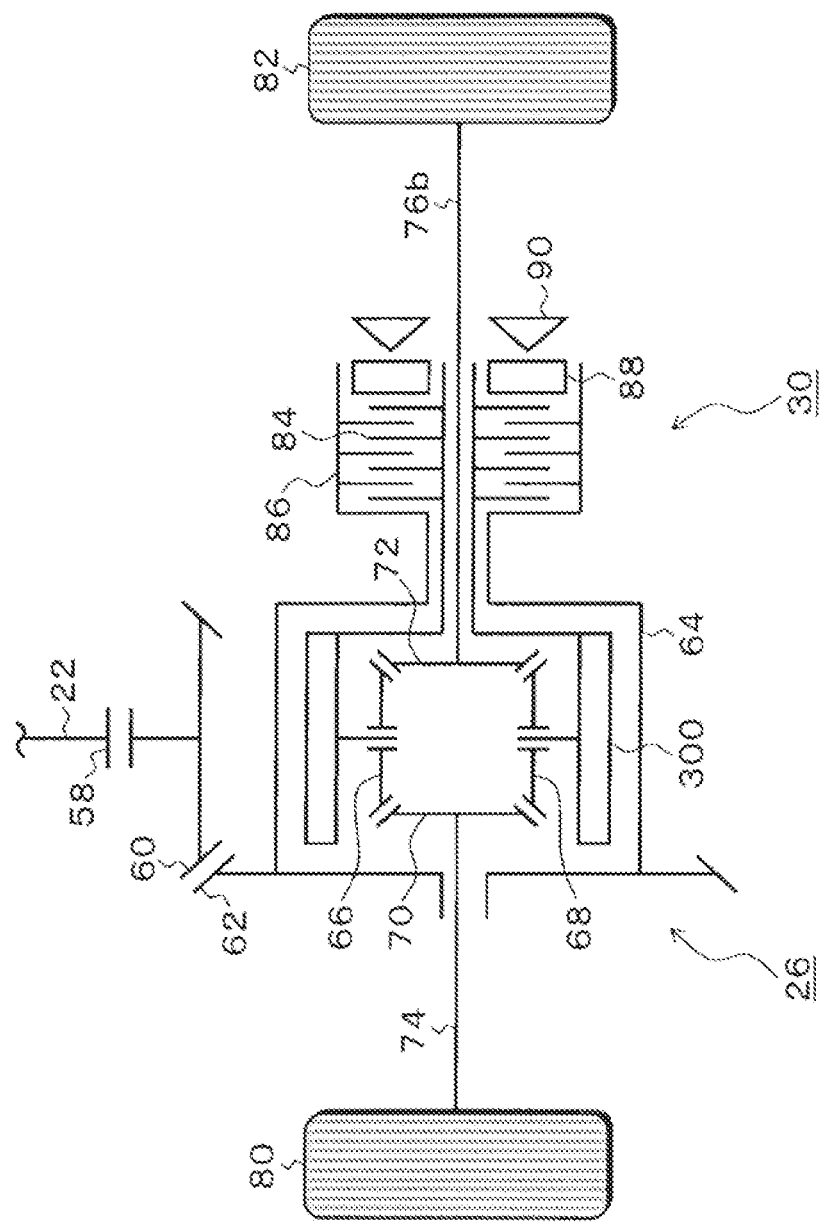
FIG. 6 is an illustrative diagram depicting, with a skeleton diagram, a comparison example of the multi-plate clutch mechanism achieving the same function as that of FIG. 5.

FIG. 6 is an illustrative diagram depicting, with a skeleton diagram, a comparison example of the multi-plate clutch mechanism achieving the same function as that of FIG. 5. In the comparison example of FIG. 6, the multi-plate clutch mechanism 30 is characterized as being integrated with the rear-wheel differential device 26. In FIG. 6, the multi-plate clutch mechanism 30 is disposed between the ring gear 62 of the rear-wheel differential device 26 and a storage barrel 300 that transmits the rotation of the ring gear to the pinions 66 and 68. That is, the rotation of the ring gear 62 is transmitted to the outer hub 86 integrated via a differential case 64, and the inner hub 84 is coupled to a rotating shaft of the storage barrel 300. When the multi-plate clutch mechanism 30 is fastened, the rotation of the ring gear 62 rotates the storage barrel 300 via the multi-plate clutch mechanism 30. This rotates the pinions 66 and 68, thereby transmitting a driving force via the side gears 70 and 72 to the right-rear wheel 82 and the left-rear wheel 80. Also in the comparison example depicted in FIG. 6, when the disengaging device 28 is unconnected as depicted in FIG. 4 in the two-wheel-drive mode and the multi-plate clutch mechanism 30 is disconnected, the rotation of the rear-wheel drive system between the bevel gear 52 of the first driving-force transmitting direction converting unit 20 to the drive pinion 60 of the second driving-force transmitting direction converting unit 24 depicted in FIG. 4 can be stopped. However, in the comparison example depicted in FIG. 6, since the multi-plate clutch mechanism 30 is integrally provided with the rear-wheel differential device 26, any conventional rear-wheel differential device cannot be applied as it is, and a new device with the rear-wheel differential device 26 and the multi-plate clutch mechanism 30 integrated together is required to be configured, resulting in a complex structure. Also, since the multi-plate clutch mechanism 30 is disposed between the second driving-force transmitting direction converting unit 24 on a driving-force input side and the rear-wheel differential device 26, a clutch torque capacity multiplied by a gear ratio of the second driving-force transmitting direction converting unit 24, for example, approximately two- to three-fold clutch torque capacity, is required, thereby upsizing the multi-plate clutch mechanism 30 to invite an increase in weight and cost. Furthermore, since the rear-wheel differential device 26 and the multi-plate clutch mechanism 30 are disposed in the same casing with the differential case 64 and the outer hub 86 integrated together, lubricating oils for use in the rear-wheel differential device 26 and the multi-plate clutch mechanism 30 are different from each other in performance, and a lubricating-oil separation structure for preventing both lubricating oils from being mixed together is required. This makes the structure even more complex. By contrast, since the multi-plate clutch mechanism 30 of the present embodiment depicted in FIG. 5 is provided on the rear-wheel driving shaft between the rear-wheel differential device 26 and, for example, the right-rear wheel 82, the transmission torque is distributed within the rear-wheel differential device 26. Therefore, the clutch torque capacity of the multi-plate clutch mechanism 30 can be ½ compared with the comparison example of FIG. 6, and this achieves downsizing and light weight of the multi-plate clutch mechanism 30, thereby reducing cost. Also, since the multi-plate clutch mechanism 30 can be provided as another device (i.e., unit), the conventional rear-wheel differential device 26 can be applied as it is, thereby allowing cost reduction in constructing the driving-force transmitting apparatus 10 of the present embodiment.

Figure 7:
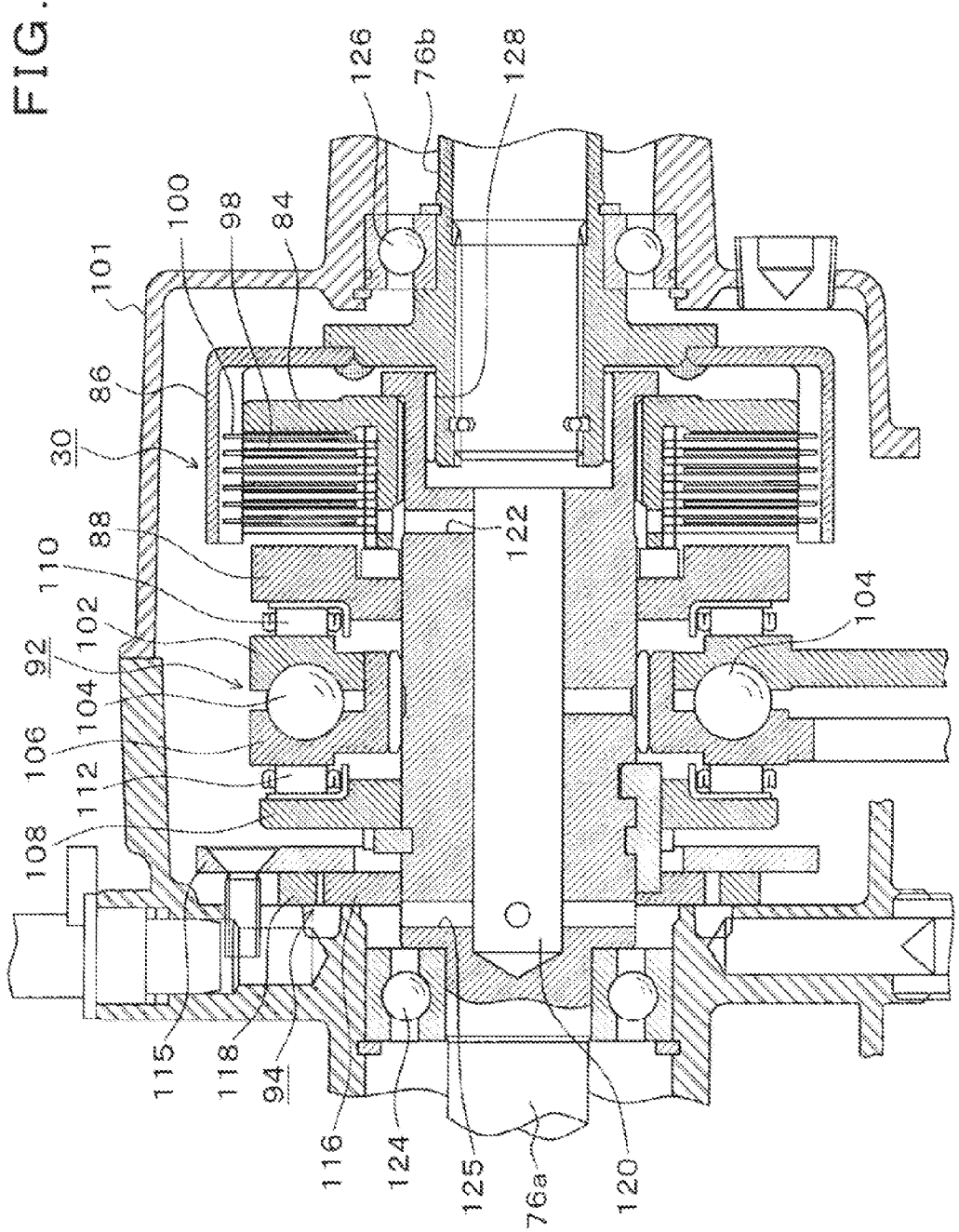
FIG. 7 is a section view depicting an embodiment of the multi-plate clutch mechanism for use in the present invention.

FIG. 7 is a section view depicting an embodiment of the multi-plate clutch mechanism for use in the present invention. In FIG. 7, the multi-plate clutch mechanism is set between the right-rear-wheel driving shaft 76a input from a rear-wheel differential device 26 side and the right-rear-wheel driving shaft 76b coupled to the right-rear wheel. In the following description, as required, the right-rear-wheel driving shaft 76a is assumed to be an input driving shaft and the right-rear-wheel driving shaft 76 is assumed to be an output driving shaft. The multi-plate clutch mechanism 30 has the inner hub 84 fixed at a right shaft end of the input driving shaft 76a with spline fitting and the outer hub 86 fixed at a left shaft end of the output driving shaft 76b disposed outside thereof. Between the inner hub 84 and the outer hub 86, a plurality of clutch plates are alternately disposed to fit in. Fastening and disengaging force of the multi-plate clutch mechanism 30 is adjusted by a ball cam mechanism 92 provided on a left side. The ball cam mechanism 92 has a piston 88 disposed on the left side of the clutch plates of the multi-plate clutch mechanism 30 so as to slide in an axial direction, a rotation cam plate 102 and a fixing cam plate 106 disposed via a thrust bearing 110 on the left side of the piston 88, and a ball 104 interposed therebetween. The ball 104 fits in a cam groove formed in a circumferential direction on surfaces of the fixing cam plate 106 and the rotation cam plate 102 facing each other. The cam groove in the circumferential direction is at the deepest in a state of interposing the ball 104 as depicted, and the depth of the cam groove is shallower in the circumferential direction. For this reason, when the rotation cam plate 102 is rotated by an actuator with the engagement of the pinion gear with a fan-shaped gear provided at the tip side of an arm portion 102a extending on the lower side of the rotation cam plate 102, the ball 104 moves along the cam groove varying in depth to move the rotation cam plate 102 to right, advance the piston 88 to a multi-plate mechanism 30, and press the clutch plates, thereby generating a clutch fastening force. A reaction force along with the movement of the piston 88 with the rotation of the rotation cam plate 102 is received by the fixing plate 108 via a thrust bearing 112. An oil pump 94 is disposed on the left side of the ball cam mechanism 92. The oil pump 94 is configured of an inner gear 116 functioning as a rotor and an outer gear 118 functioning as a stator. The inner gear 116 is fixed to the input driving shaft 76a coupled to the side gear 72 of the rear-wheel differential device 26, and the outer gear 118 is fixedly interposed between an inner wall of a casing 101 and a bolted fixing plate 115. In the oil pump 94, the inner gear 116 and the outer gear 118 have a relation such that, compared with the number of gears n of the inner gear 116, the number of gears of an internal tooth of the outer gear 118 is larger by one, that is, n+1. The inner gear 116 is coaxially coupled to the input driving shaft 76a. With the rotation of the inner gear 116 for the outer gear 118 eccentrically disposed with respect to the inner gear 116, a pump action of sucking and discharging oil is achieved. The oil pump 94 sucks and discharges oil accumulated in the casing 101, discharging lubricating oil to an oil chamber 120 formed in a direction from a discharge path 125 in an inner axial direction of the input driving shaft 76a. The lubricating oil discharged to the oil chamber 120 passes through an oil supply hole 122 to be supplied from an inner hub 84 side in the multi-plate clutch mechanism 30 to a space between the clutch plates, thereby cooling heat due to friction contact of the clutch plates and lubricating them at the time of adjusting the fastening force. The supply of lubricating oil to the multi-plate clutch mechanism is required when the multi-plate clutch mechanism is fastened or the fastening force is adjusted in the four-wheel drive mode. In the two-wheel drive mode, the multi-plate clutch mechanism 30 is in a disconnected state. To eliminate drag torque for stopping the rear-wheel drive system from the bevel gear 52 to the drive pinion 60 depicted in FIG. 4, in the two-wheel drive mode, lubricating oil is not supplied to the multi-plate clutch mechanism 30. Supply of lubricating oil to the multi-plate clutch mechanism 30 in the four-wheel drive mode and stop of the supply of lubricating oil in the two-wheel drive mode will be clarified in description further below.

Figure 8:
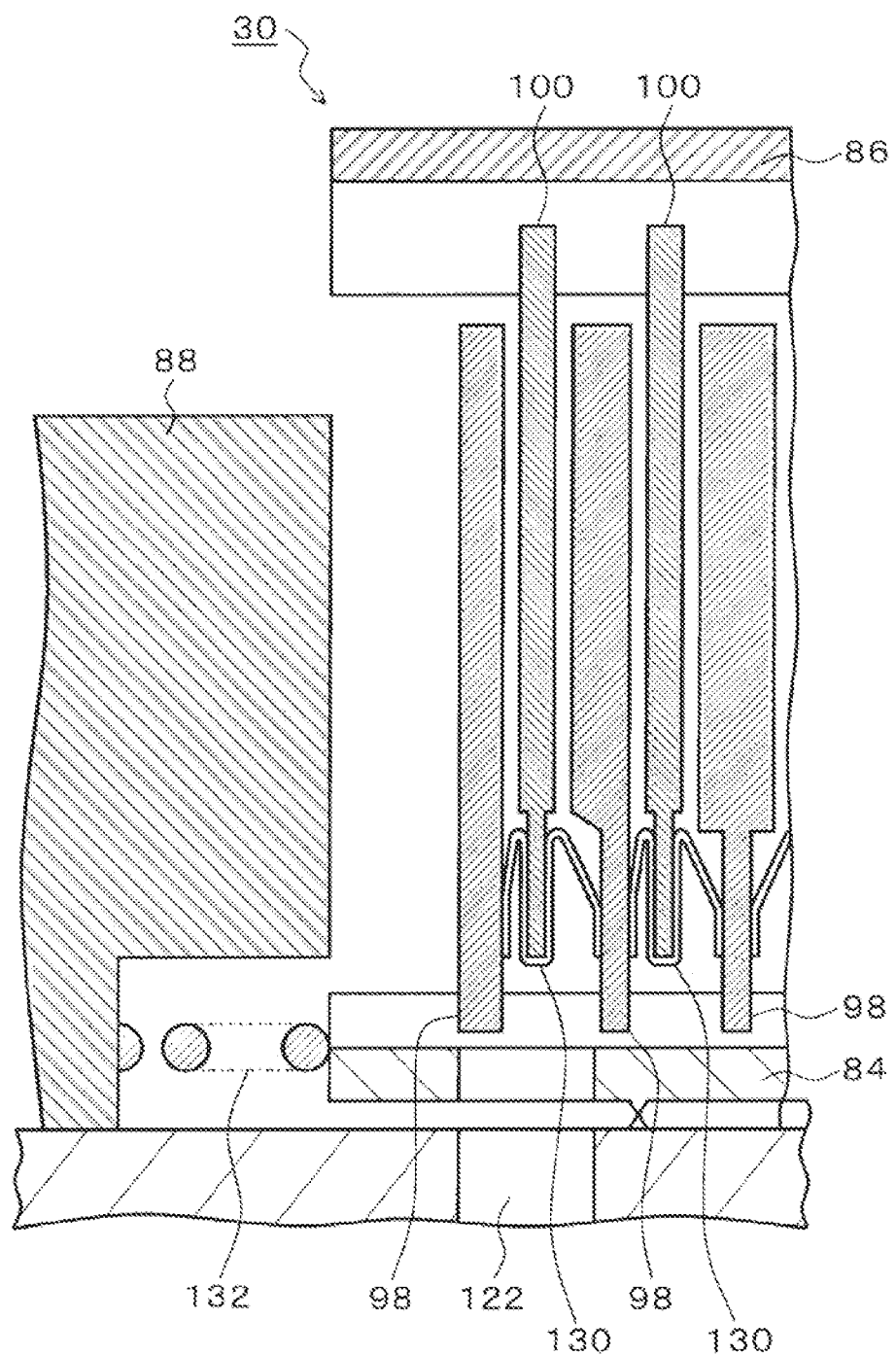
FIG. 8 is an illustrative diagram depicting a mount state of spring members for ensuring space in the multi-plate clutch mechanism of FIG. 7.

FIG. 8 is an illustrative diagram depicting a mount state of spring members for ensuring space in the multi-plate clutch mechanism of FIG. 7. In FIG. 8, the multi-plate clutch mechanism 30 has an inner side of clutch plates 98 engaged with the inner hub 84 and an outer side of clutch plates 100 engaged with the outer hub 86, thereby having the clutch plates 98 and 100 alternately disposed. In a state of disposition of these clutch plates 98 and 100, they are at a fastening-released position where the piston 88 is retracted in the two-wheel drive mode. To eliminate drag torque due to the contact among the clutch plates 98 and 100 at this time, in the present embodiment, clutch spacer springs 130 are disposed on an inner side of the clutch plates 98 and 100. In a clutch-disconnected state, the space between the clutch plates 98 and 100 are widened with the clutch spacer springs 130, thereby eliminating the occurrence of friction torque due to the contact between the clutch plates 98 and 100.

FIG. 9 is an exploded assembly view depicting amount structure of the spring members on clutch plates of FIG. 8. On an inner side of the clutch plate 100 disposed on an outer hub 86 side, a spacer accommodating unit 134 is formed, in which the clutch spacer spring 130 fits. The clutch spacer spring 130 has mound-shaped spring pieces 130b and 130c formed as being bent on both sides of an interposing portion 130a. With this, the space from the facing clutch plate 98 is widened to ensure a predetermined space. Referring again to FIG. 8, a piston spacer spring 132 is disposed between the piston 88 of the ball cam mechanism 92 for adjusting the fastening force of the multi-plate clutch mechanism 30 and the inner hub 84, thereby ensuring a predetermined space therebetween in order to avoid a contact between the clutch plates of the multi-plate clutch mechanism 30 in a clutch-disconnected state in the two-wheel drive mode. As the piston spacer spring 132, a coil spring is used, for example. With this disposition of the clutch spacer springs 130 and the piston spacer spring 132 in the multi-plate clutch mechanism 30 depicted in FIG. 8, a drag-torque reducing mechanism is configured to decrease the possibility of occurrence of drag torque in the two-wheel drive mode to approximately zero, together with stopping the supply of lubricating oil.

Figure 10A:
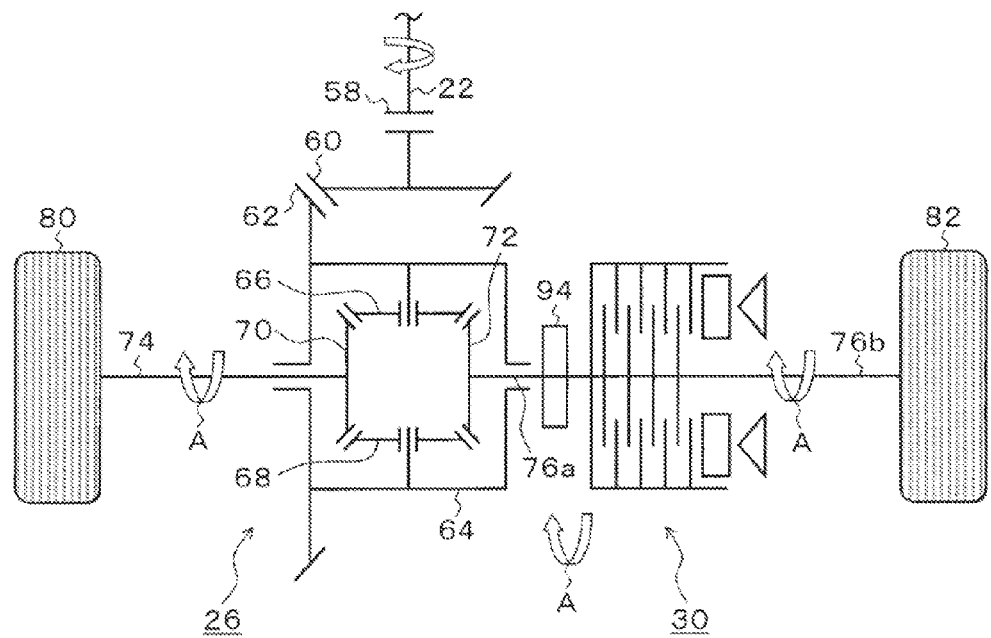
FIGS. 10A and 10B are illustrative diagrams depicting, with skeleton diagrams, a lubricating mechanism provided to a multi-plate clutch mechanism of the present invention.
Figure 10B:
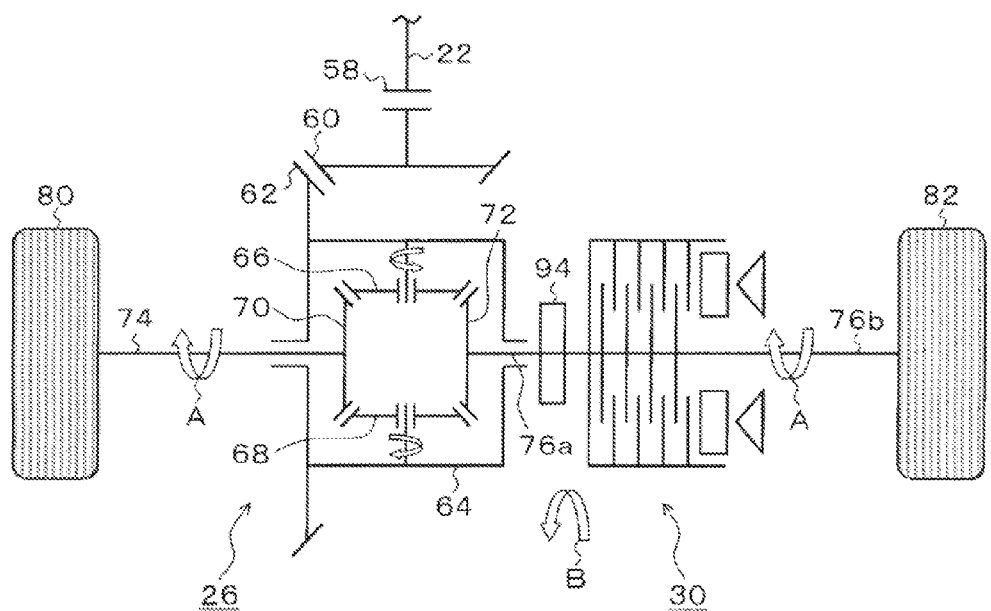

FIGS. 10A and 10B are illustrative diagrams depicting, with skeleton diagrams, a lubricating oil mechanism provided to the multi-plate clutch mechanism of the present invention. The diagram depicted in FIG. 10A is in the four-wheel drive mode, and the diagram depicted in FIG. 10B is in the two-wheel drive mode. In the four-wheel drive mode of FIG. 10A, the multi-plate clutch mechanism 30 is in a fastened state. The driving force from the propeller shaft 22 is input from the drive pinion to the ring gear 62 of the rear-wheel differential device 26, and is then transmitted via the pinions 66 and 68 and the side gears 70 and 72 to the left-rear wheel 80 and the right-rear wheel 82 via the left-rear-wheel driving shaft 74 and the right-wheel driving shafts 76a and 76b fastened with the multi-plate clutch mechanism 30 for transmission of the driving force onto the road surface. The oil pump 94 provided in the multi-plate clutch mechanism 30 causes the right-rear-wheel driving shaft 76a coupled to the side gear 72 of the rear-wheel differential device 26 to rotate as an input driving shaft, sucks oil outside of the casing of the multi-plate clutch mechanism 30, and supplies lubricating oil between the clutch plates. In this four-wheel drive mode, since the multi-clutch mechanism is in a fastened state, all of the left-rear-wheel driving shaft 74 and the right-rear-wheel driving shafts 76a and 76b rotate in a direction of forward rotation as indicated by an arrow A.

Figure 11A:
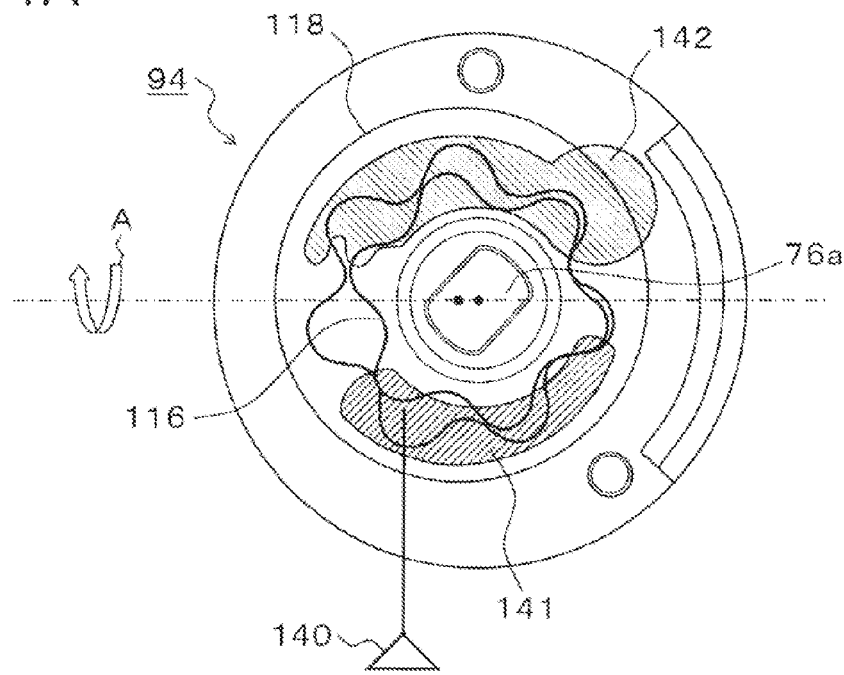
FIGS. 11A and 11B are illustrative diagrams depicting switching between an inlet port and outlet port in two-wheel-drive mode and four-wheel-drive mode of an oil pump of FIGS. 10A and 10B.
Figure 11B:
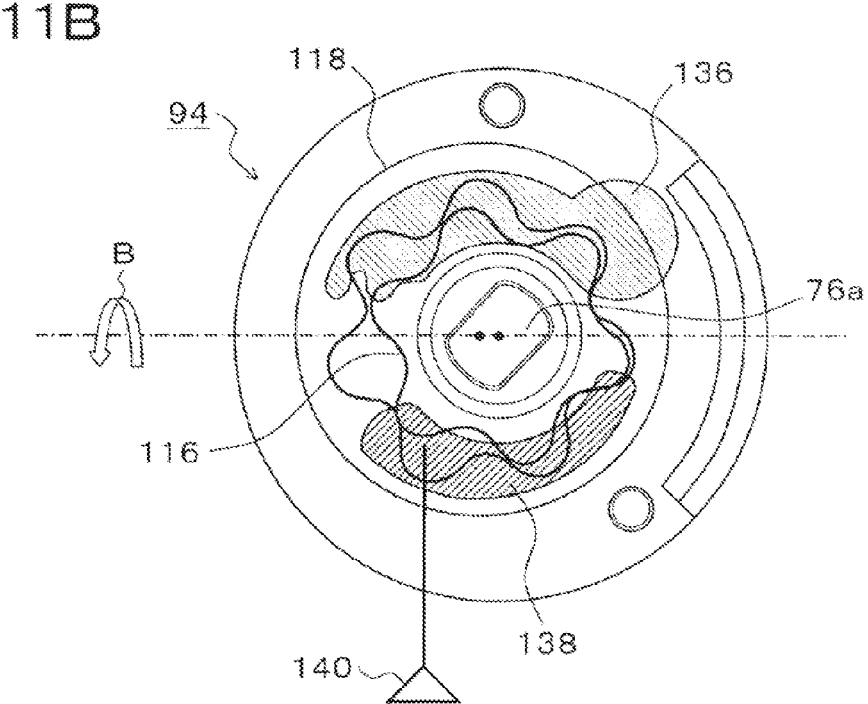

FIG. 11A depicts an end face view of the oil pump in the four-wheel drive mode. The oil pump 94 is configured of the inner gear 116 operating as a rotor coaxially disposed in the input driving shaft 76a from the rear-wheel differential device 26 and the outer gear 118 eccentrically disposed on a casing side and rotatably supported. While the number of gears of the inner gear 116 is six, the number of inner tooth of the outer gear 118 is larger by one, that is, seven. In the four-wheel drive mode, the inner gear 116 of the oil pump 94 rotates forward in a rotating direction indicated by the arrow A with the input driving shaft 76a. A strainer 140 sucking lubricating oil in the casing is led to a suction port 141 on a lower side to discharge oil sucked from the suction port 141 to a discharge port 142 on an upper side, supplying lubricating oil to a portion of the clutch plates of the multi-plate clutch mechanism. In the two-wheel drive mode of FIG. 10B, the multi-plate clutch mechanism 30 becomes in a disconnected state, and the coupling between the right-rear-wheel driving shaft 76b of the right-rear wheel 82 and the right-rear-wheel driving shaft 76a as the input driving shaft having the side gear 72 of the rear-wheel differential device 26 coupled thereto is being cut off. Therefore, the rotation of the right-rear wheel 82 is not transmitted to the side gear 72. Therefore, the rotation of the side gear 70 with the left-rear wheel 80 rotates the side gear in a reverse direction via the pinions 66 and 68. That is, in the two-wheel drive mode, while the left-rear-wheel driving shaft 74 and the right-rear-wheel driving shaft 76b on a right-rear wheel 82 side disconnected by the multi-plate clutch mechanism 30 rotate forward as indicated by the arrows A, the right-rear-wheel driving shaft 76a coupled to the side gear 72 having the oil pump 94 provided thereto rotates in reverse as indicated by an arrow B. In this manner, when the rotation of the input driving shaft with respect to the oil pump 94 becomes reversed in the two-wheel drive mode, as depicted in FIG. 11B, the upper side of the oil pump 94 servers as the suction port 136, and the lower side connected to the strainer 140 serves as the discharge port 138. Therefore, since the suction port 136 side is led to a lubricant oil passage of the clutch plates in the multi-plate clutch mechanism 30, oil cannot be sucked from this lubricating oil passage and, with the reverse rotation in the rotating direction B, the supply of lubricating oil with respect to the multi-plate clutch mechanism 30 by the oil pump 94 is stopped. In this manner, in the two-wheel drive mode, the reverse rotation of the oil pump 94 stops the supply of lubricating oil to the multi-plate clutch mechanism 30, and lubricating oil is not supplied to the space between the clutch plates in a clutch-disconnected state. With this, drag torque due to friction loss by agitation of lubricating oil can be approximately zero. Meanwhile, as depicted in FIG. 10B and FIG. 11B, when the oil pump 94 is rotated in reverse in the two-wheel drive mode, lubricating oil cannot be sucked, thereby causing a shortage of lubricating oil inside the oil pump 94. When a shortage of lubricating oil occurs in the oil pump 94 itself, as depicted in FIG. 7, the pump gear rotating in contact with the inner wall surface of the casing 101 and the plate surface of the fixing plate 115 may possibly cause seizing due to the shortage of lubricating oil. To get around this, in the present embodiment, a sliding contact surface with a fixing side of the outer gear 118 and the inner gear 116 provided to the oil pump 94 is subjected to a surface treatment, such as plating or DLC coating, thereby forming an anti-seizing processed layer. With this, even when oil cannot be sucked due to the reverse rotation of the oil pump 94 in the two-wheel drive mode to cause a shortage of lubricating oil in the oil pump 94 itself, seizing due to a shortage of lubricating oil can be reliably prevented, with the anti-seizing processed layer being formed on the sliding contact surface of the pump gear.

Figure 12A:
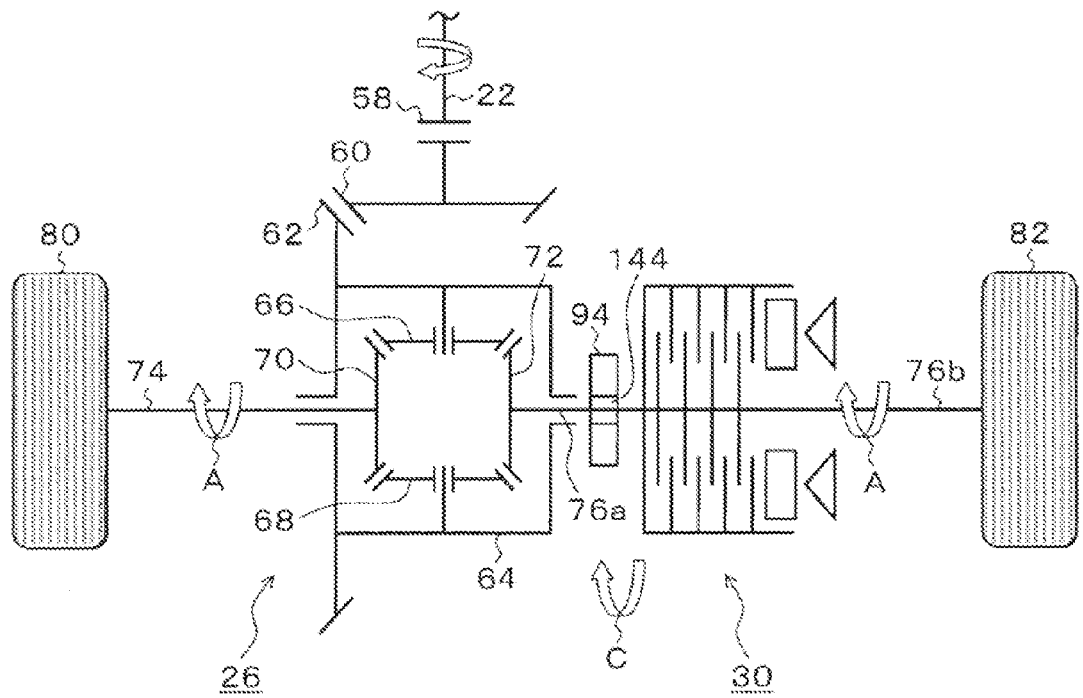
FIGS. 12A and 12B are illustrative diagrams depicting, with skeleton diagrams, another lubricating mechanism using a one-way clutch as an oil pump.
Figure 12B:
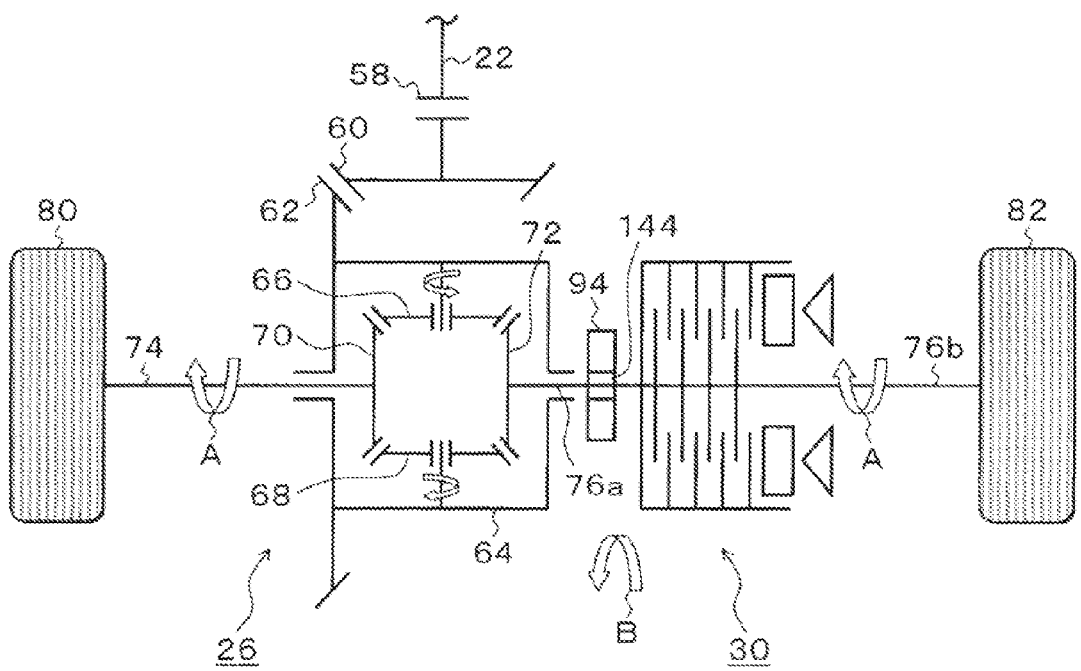

FIGS. 12A and 12B are illustrative diagrams depicting, with skeleton diagrams, another embodiment of the lubricating-oil supply mechanism using a one-way clutch as an oil pump. The diagram depicted in FIG. 12A is in the four-wheel drive mode, and the diagram depicted in FIG. 12B is in the two-wheel drive mode. When the four-wheel drive mode of FIG. 12A is taken as an example, in the oil pump 94 disposed on a left side of the multi-plate clutch mechanism 30, the inner gear is mounted via a one-way clutch 144 on the right-rear-wheel driving shaft 76a as an input driving shaft coupled to the side gear of the rear-wheel differential device 26. In the one-way clutch 144, for the forward rotation of the right-rear-wheel driving shaft 76a with the side gear 72 in an arrow A direction, the clutch is actuated to rotate the inner gear of the oil pump 94. For the reverse direction, coupling of the one-way clutch 144 is released, resulting in idling of only the one-way clutch 144. Therefore, in the four-wheel drive mode of FIG. 12A, the driving force from the propeller shaft 22 is input to the rear-wheel differential device 26. Since the multi-plate clutch mechanism 30 is in a fastened state, the rotation of the ring gear 62 is transmitted to the left-rear wheel 80 via the pinions 66 and 68 and the side gears 70 and 72 and to the right-rear wheel 82 via the multi-plate clutch mechanism 30 in a fastened state for transmission of the driving force onto the road surface. Therefore, in the four-wheel drive mode, the left-front-wheel driving shaft 74 and the right-rear-wheel driving shafts 76a and 76b rotate forward as indicated by the arrow A. With forward rotation of the right-rear-wheel driving shaft 76a coupled to the side gear 72, the one-way clutch 144 performs a clutch operation to rotate the inner gear of the oil pump 94, thereby supplying lubricating oil to the multi-plate clutch mechanism 30.

FIG. 12B depicts the two-wheel drive mode. Since the multi-plate clutch mechanism 30 is in a disconnected state, the coupling between the side gear 72 of the rear-wheel differential device 26 and the right-rear wheel 82 is disconnected. Therefore, the rotation of the right-rear wheel 82 in a forward direction indicated by the arrow A with the right-rear-wheel driving shaft 76b is not transmitted to the side gear 72 of the rear-wheel differential device 26. The rotation of the side gear 70 with the rotation of the left-rear wheel 80 in a forward direction indicated by the arrow A with the left-front-wheel driving shaft 74 is transmitted via the pinions 66 and 68 to the side gear 72, and the side gear 72 rotates the rear-wheel driving shaft 76 in reverse, as indicated by an arrow B. With this reverse rotation of the right-rear-wheel driving shaft 76a, the one-way clutch 144 idles without rotating the inner gear of the oil pump 94. As a result, in the two-wheel drive mode, the supply of lubricating oil to the multi-plate clutch mechanism 30 is stopped, with the oil pump 94 not being rotated.

Figure 13:
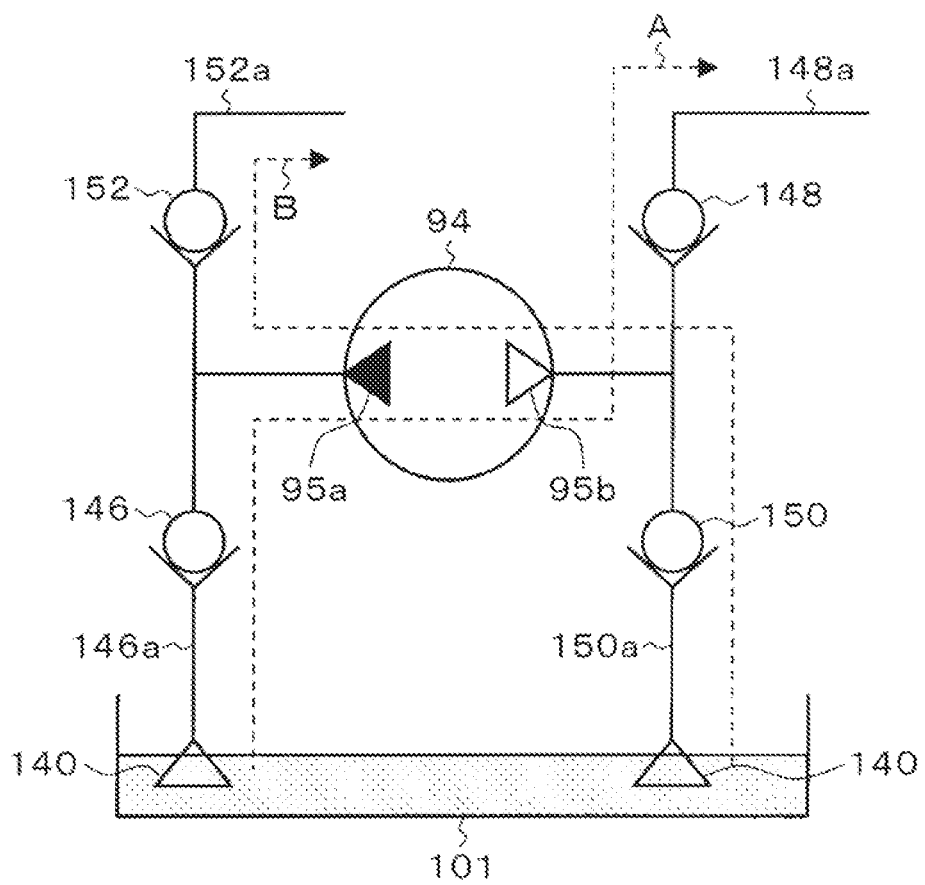
FIG. 13 is an oil-hydraulic circuit diagram depicting a lubricating mechanism of a multi-plate clutch mechanism, the lubricating mechanism switching a route of an oil pump with check valves.

FIG. 13 is an oil-hydraulic circuit diagram depicting another embodiment of a lubricating-oil supply mechanism in a multi-plate clutch mechanism, the lubricating-oil supply mechanism switching a route of the oil pump with check valves. In FIG. 13, as depicted in FIGS. 10A and 10B and FIGS. 12A and 12B, the oil pump 94 rotates forward in the four-wheel drive mode, and rotates in reverse in the two-wheel drive mode. Here, the discharge port of the oil pump 94 is represented by a black triangle as a port 95a at the time of forward rotation and by a white triangle as a port 95b at the time of reverse rotation. First, when the oil pump 94 rotates in reverse in the two-wheel drive mode, the oil pump 94 causes oil in the casing 101 to be sucked from the strainer 140 into the port 95a via a first suction path check valve 146 provided to a first suction path 146a, and supplies the lubricating oil from the port 95b via a first discharge path check valve 148 provided to a first discharge path 148b to a portion other than the multi-plate clutch mechanism along a path indicated by an arrow A. Therefore, when the oil pump 94 rotates forward, the supply of lubricating oil to the multi-plate clutch mechanism is stopped. On the other hand, when the oil pump 94 rotates forward in the four-wheel drive mode, the oil pump 94 causes oil in the casing 101 to be sucked from the strainer 140 into the port 95b via a second suction path check valve 150 provided to a second suction path 150a, and supplies the lubricating oil from the port 95a via a second discharge path check valve 152 provided to a second discharge path 152a to the multi-plate clutch mechanism along a path indicated by an arrow B. In this manner, by providing a switching circuit of four check valves to the oil pump 94 that rotates in reverse in the two-wheel drive mode and rotates forward in the four-wheel drive mode, lubricating oil can be supplied to the multi-plate clutch mechanism in the four-wheel drive mode. In the two-wheel drive mode, the supply of lubricating oil to the multi-plate clutch mechanism is stopped, thereby causing drag torque to be approximately zero.

Figure 14:
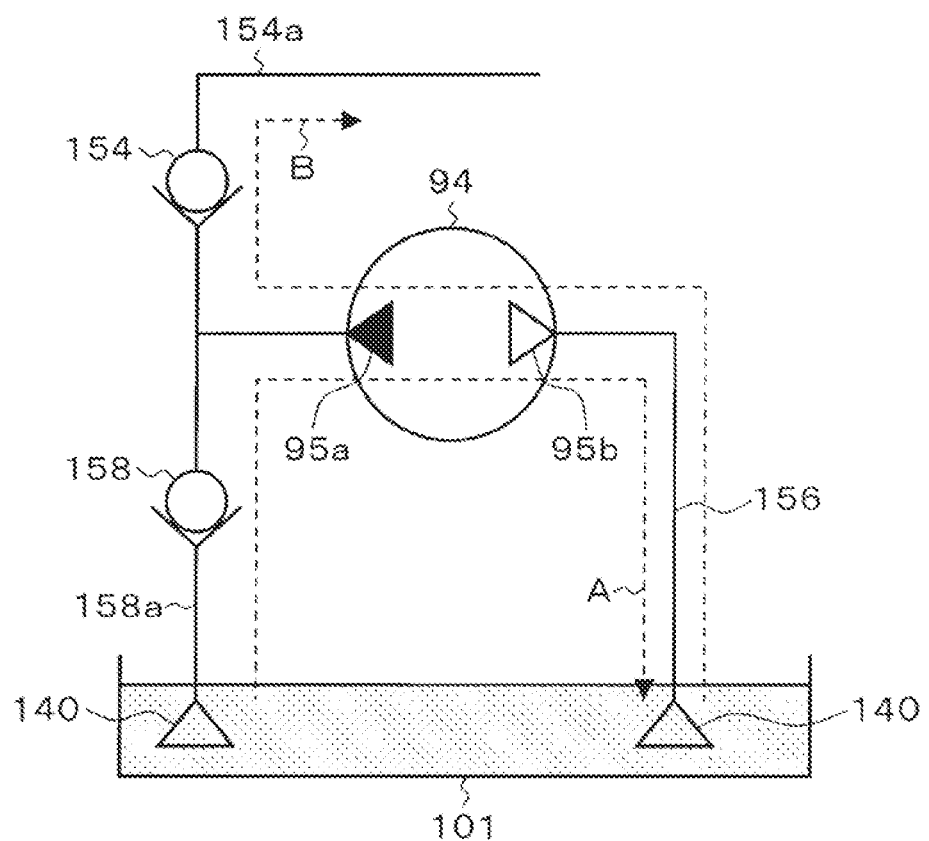
FIG. 14 is an oil-hydraulic circuit diagram depicting another lubricating mechanism of the multi-plate clutch mechanism, the lubricating mechanism switching the route of the oil pump with the check valves.

FIG. 14 is an oil-hydraulic circuit diagram depicting another embodiment of the lubricating-oil supply mechanism switching the route of the oil pump with the check valves. While four check valves are provided in the embodiment of FIG. 13, the present embodiment is characterized in that only two check valves are enough. In FIG. 14, when the oil pump 94 rotates in reverse in the two-wheel drive mode, a circulation loop indicated by an arrow A is formed in which oil in the casing 101 is sucked from the strainer 140 via a suction path check valve 158 provided to a suction path 158a into the port 95a and is returned into the casing 101 from the port 95b via a dual-purpose discharge and suction path 156. Lubricating oil is not supplied from the oil pump 94 to other regions including the multi-plate clutch mechanism. On the other hand, in the four-wheel drive mode, the oil pump 94 rotates forward to cause oil in the casing 101 to be sucked from the strainer 140 by the dual-purpose discharge and suction path 156 into the port 95b and to be discharged from the port 95a. Along a route indicated by an arrow B via a discharge path check valve 154 provided to a discharge path 154a, lubricating oil is supplied to the multi-plate clutch mechanism. That is, in the reverse rotation of the oil pump 94 in the two-wheel drive mode, circulation of oil indicated by the arrow A is performed, and lubricating oil is not supplied to the multi-plate clutch mechanism, thereby causing drag torque of the multi-plate clutch mechanism due to lubricating oil to be approximately zero. On the other hand, in the forward rotation of the oil pump 94 in the four-wheel drive mode, lubricating oil is supplied to the multi-plate clutch mechanism along the lubricating route indicated by the arrow B, thereby appropriately lubricating and cooling the clutch plates when the clutch fastening force is adjusted.

Figure 15:
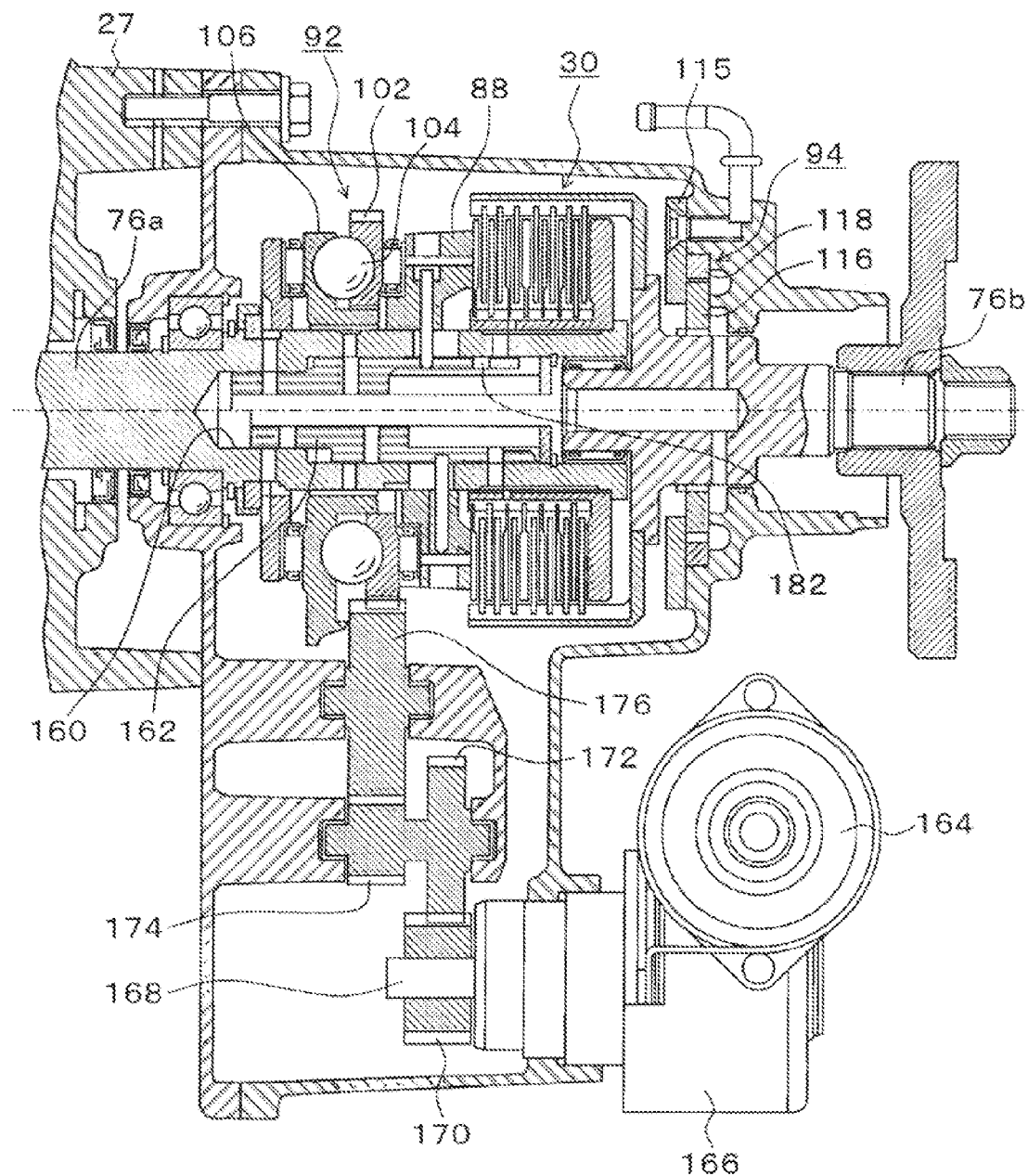
FIG. 15 is a section view depicting an embodiment of a multi-plate clutch mechanism provided with a lubricating mechanism that opens and closes a lubricating route in synchronization with a piston that adjusts a clutch fastening force.

FIG. 15 is a section view depicting an embodiment of a multi-plate clutch mechanism provided with a lubricating-oil supply mechanism that opens and closes a lubricating route in synchronization with a piston that adjusts a clutch fastening force. In FIG. 15, the multi-plate clutch mechanism 30 is accommodated in the casing 101 coupled to a casing 27 on a rear-wheel differential device 26 side, and is mounted on a butt portion between the input driving shaft 76a from the rear-wheel differential device 26 and the right-rear-wheel driving shaft 76b from a right-rear wheel side. The multi-plate clutch mechanism 30 can adjust the fastening force with the movement of the piston 88 in a right direction by the ball cam mechanism 92 disposed on a left side. The ball cam mechanism 92 includes the rotation cam plate 102, the ball 104, and the fixing cam plate 106. In the present embodiment, the rotation cam plate 102 uses a rotation cam plate gear having a gear formed on an outer perimeter. The fastening force of the multi-plate clutch mechanism 30 with the ball cam mechanism 92 is adjusted by a servo motor 164 disposed on a lower side of the casing 101. The rotation of the servo motor 164 is decelerated by a decelerator 166, and then a gear 170 provided to a driving shaft 168 is rotated. The rotation of the gear 170 is transmitted via gears 172, 174, and 176 to the rotation cam plate gear 102. With a change in position of the ball 104 with the rotation of the rotation cam plate gear 102 with respect to the cam groove, the rotation cam plate 102 is moved in a right direction. Accordingly, the piston 88 is pressed on to the clutch plates of the multi-plate clutch mechanism 30 to adjust the fastening force. In the present embodiment, the oil pump 94 is disposed so as to rotate with the right-rear-wheel driving shaft 76b coupled to the right-rear wheel on a right side of the multi-plate clutch mechanism 30. That is, the oil pump 94 has the inner gear 116 coaxially fixed to the right-rear-wheel driving shaft 76b and the outer gear 118 rotatably supported at an eccentric position outside thereof by being interposed between a casing inner wall and the fixing plate 115. As a lubricating-oil supply mechanism from this oil pump 94, in the present embodiment, an oil path inside of the right-rear-wheel driving shaft 76b that rotates the oil pump 94 communicates with a valve chamber 160 shaped like a cylinder with steps formed in an inner axial direction in the input driving shaft 76a coupled to the rear-wheel differential device 26, thereby supplying lubricating oil from the oil pump 94 into the valve chamber 160. In the valve chamber 160, a valve member 162 is movably incorporated in an axial direction, and a port 182 is provided at a position of the valve member 162 facing the multi-plate clutch mechanism 30. As will be clarified in description further below, the valve member 162 moves in an axial direction in synchronization with the piston 88 operating by the ball cam mechanism 92. With this, the port 182 is opened and closed for an oil supply hole on a multi-plate clutch mechanism 30 side, thereby switching between supply and stop of lubricating oil. Here, a portion on a side above a center line of FIG. 15 depicts an operation state in the two-wheel drive mode, in which the piston 88 is retracted to disconnect the multi-plate clutch mechanism 30. On the other hand, a portion on a side below the center line depicts an operation state in the four-wheel drive mode, in which the piston 88 is moved by the ball cam mechanism 92 to cause the multi-plate clutch mechanism to be in a fastened state.

Figure 16:
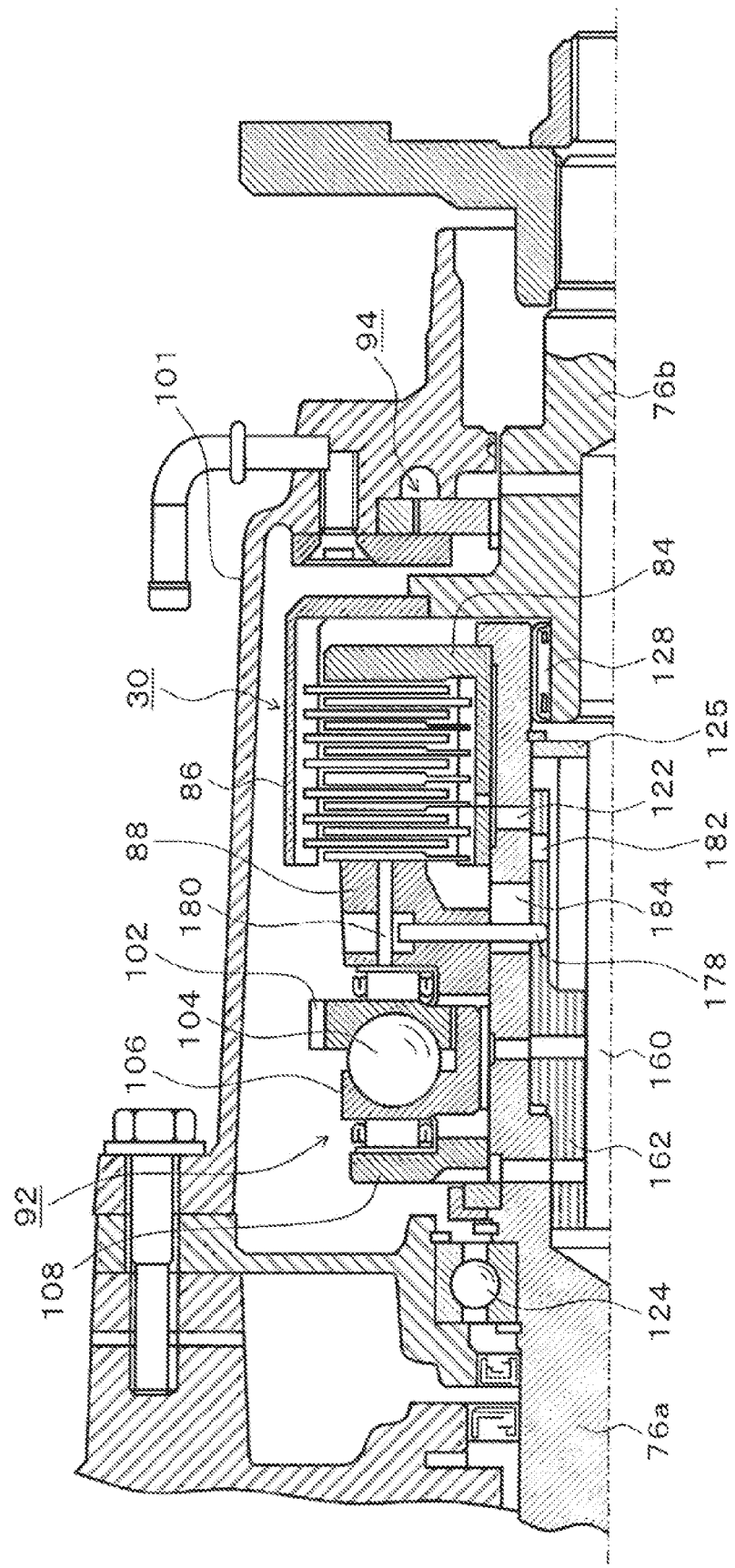
FIG. 16 is a section view depicting an extracted portion in a clutch-disconnected state on a side above a center line in the multi-plate clutch mechanism of FIG. 15.

FIG. 16 is a section view depicting an extracted portion in a clutch-disconnected state on the side above the center line in the multi-plate clutch mechanism of FIG. 15. The clutch-disconnected state in FIG. 16 represents an operation state in the two-wheel drive mode. With the ball cam mechanism 92, the piston 88 has been returned to a retracted position with the pressing force of the clutch plates of the multi-plate clutch mechanism 30 being released. To the piston 88, from a radius direction via a long hole 184 of the input driving shaft 76a, a coupling pin 178 is coupled with its tip fitting in the valve member 162. Therefore, in synchronization with the movement of the piston 88 by the ball cam mechanism 92, the valve member 162 accommodated in the valve chamber 160 can be moved in an axial direction. The oil supply hole 122 is provided at a position of the input driving shaft 76a in which the valve chamber 160 is formed, the position corresponding to the multi-plate clutch mechanism 30. The oil supply hole 122 supplies lubricating oil from an oil hole of the inner hub 84 to a space between the clutch plates. For the oil supply hole 122 on the input driving shaft 76a side, the port 182 is provided on the valve member 162 retracted via the coupling pin 178 at a position where the piston 88 becomes in a clutch-disconnected state. In a clutch-disconnected state, the port 182 is at a position off from the oil supply hole 122, closing the oil supply hole 122 to stop the supply of lubricating oil from the oil pump 94 to the multi-plate clutch mechanism 30. Also, a retaining ring 125 is provided on a right side of the valve chamber 160, regulating a movement position of the valve member 162. Furthermore, a needle bearing 128 is interposed in a coaxial fitting portion between tips of the input driving shaft 76a and the right-rear-wheel driving shaft 76b to allow relative rotation. In this manner, in the two-wheel drive mode depicted in FIG. 16, retraction of the piston 88 by the ball cam mechanism 92 disconnects the fastened state of the multi-plate clutch mechanism 30, and the motion of the piston 88 moves the valve member 162 accommodated in the valve chamber 160 with the coupling pin 178 to a retracted position on a right side. With this, communication of the port 182 with the oil supply hole 122 is eliminated, the supply of lubricating oil by the oil pump 94 to a space between the clutch plates of the multi-plate clutch mechanism 30 is stopped, and drag torque in a clutch-disconnected state is approximately zero.

Figure 17:
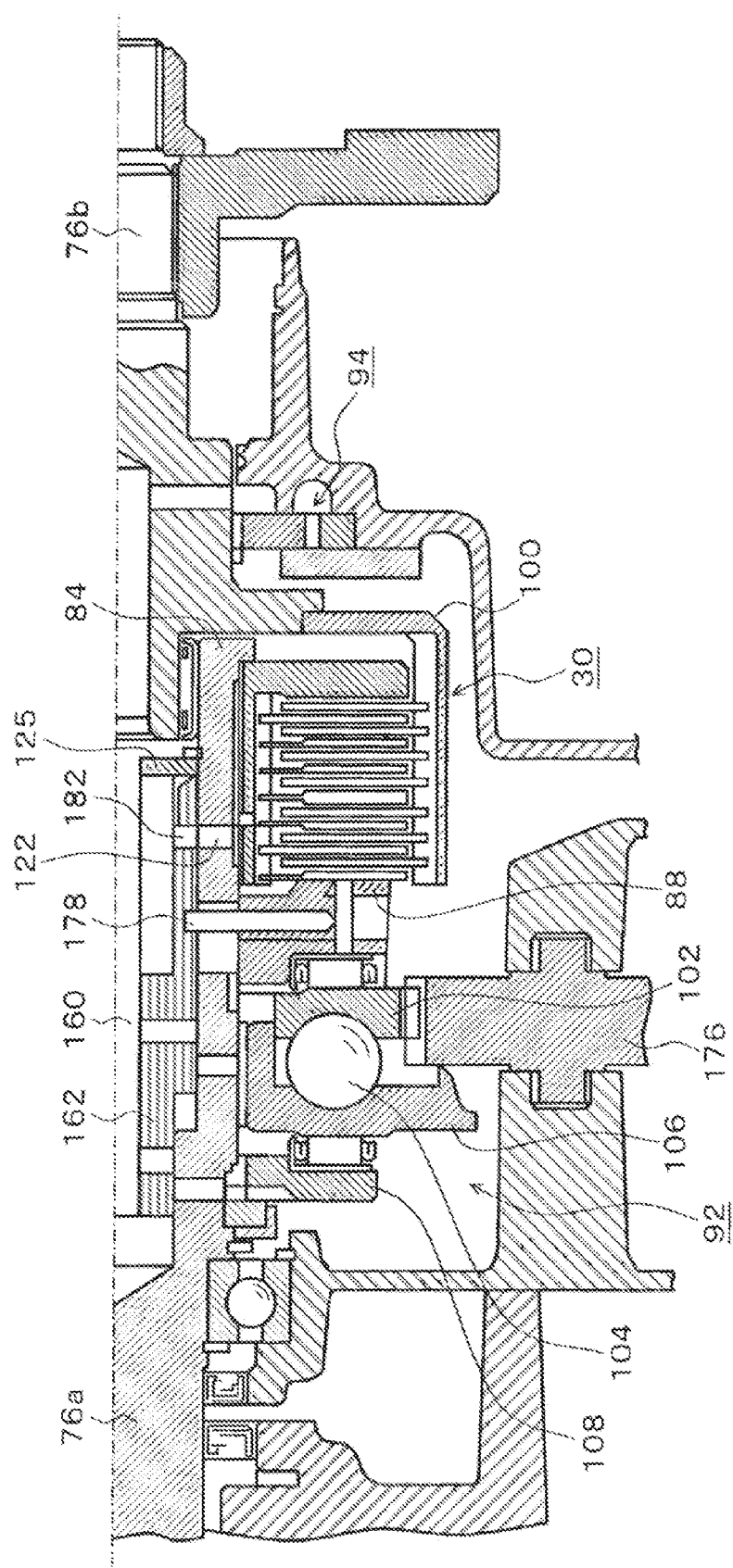
FIG. 17 is a section view depicting that a portion in a clutch-disconnected state on a side below the center line in the multi-plate clutch mechanism of FIG. 15 is removed.

FIG. 17 is a section view depicting an extracted portion in a clutch-fastened state on a side below the center line in the multi-plate clutch mechanism of FIG. 12. In FIG. 17, in the four-wheel drive mode, with the rotation of the rotation cam plate gear 102 of the ball cam mechanism 92, the ball 104 makes a relative movement to a shallow portion of the groove in a circumferential direction, thereby moving the rotation cam plate gear 102 in a right direction as depicted. Accordingly, with the piston 88 being pressed on a right side via a thrust bearing, the clutch plates of the multi-plate clutch mechanism 30 are pressed to be in a fastened state. In accordance with this movement of the piston 88 in a right direction, the valve member 162 also moves in a right direction vi a the coupling pin 178, thereby causing the port 182 provided to the valve member 162 to communicate with the oil supply hole 122 provided on the input driving shaft 76 fixing the inner hub 84 to open a flow path, supplying lubricating oil from the oil pump 94 to a space between the clutch plates of the multi-plate clutch mechanism 30 in a fastened state, and lubricating and cooling the clutch plates with friction contact.

FIG. 18 is a section view depicting an embodiment of a multi-plate clutch mechanism provided with a lubricating-oil supply mechanism that opens and closes a lubricating route by using a difference in rotating direction of the input and output driving shafts.

In FIG. 18, the multi-plate clutch mechanism 30 is accommodated in the casing 101 separated from the rear-wheel differential device disposed on a left side, is disposed between the input driving shaft 76a for inputting a driving force from the rear-wheel differential device and the output driving shaft 76b communicating with the right-rear wheel, and adjusts disengagement and fastening force with the ball cam mechanism 92. As for the ball cam mechanism 92, as with the embodiment of FIG. 15, the rotation from the servo motor 164 is decelerated by the decelerator 166, and the rotation cam plate gear is rotated via a gear train to move the piston 88, thereby adjusting a clutch fastening force. The oil pump 94 is provided on an output driving shaft 76b side. Therefore, in either of the two-wheel drive mode and the four-wheel drive mode, rotation is in a forward direction as indicated by an arrow A, thereby allowing lubricating oil to be always discharged. A side of discharging lubricating oil from the oil pump is supplied via a communication path in the output driving shaft 76b to an oil chamber 185 serving as a cylinder hole with steps formed on the input driving shaft 76a in an inner axial direction. On an outer perimeter side of the oil chamber 185, in addition to an oil supply hole for lubricating oil to the ball cam mechanism 92, the oil supply hole 122 is formed for supplying lubricating oil to a space between the clutch plates of the multi-plate clutch mechanism 30. As for the supply of lubricating oil in the four-wheel drive mode and stopping of the supply of lubricating oil in the two-wheel drive mode in the lubricating-oil supply mechanism in FIG. 18, oil supply is switched by using a difference in rotating direction between forward rotation of the input driving shaft 76 indicated by an arrow A in the four-wheel drive mode and reverse rotation indicated by an arrow B in the two-wheel drive mode with respect to spline fitting between an outer-perimeter spline provided on an outer perimeter of a right-side shaft end of the input driving shaft 76a and an inner-perimeter spline of the inner hub 84 fitting therein.

Figure 19A:
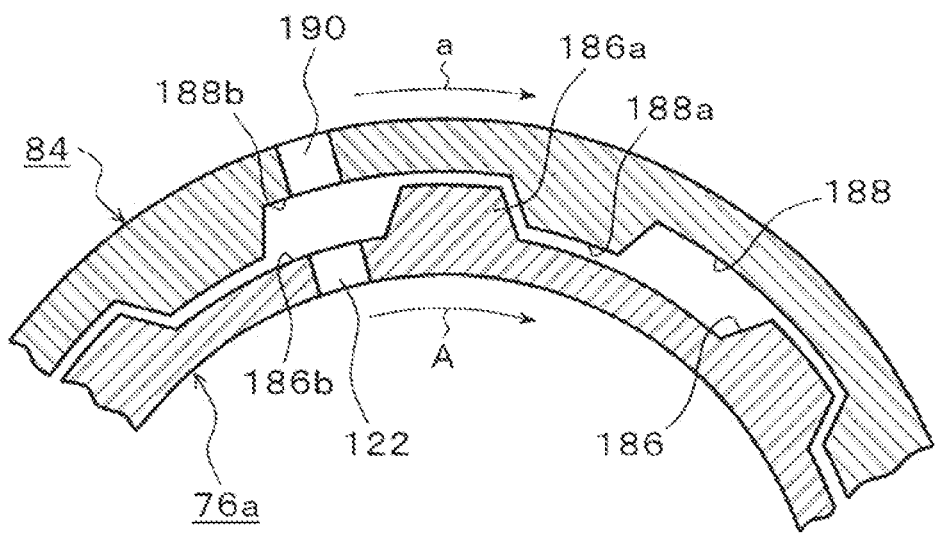
FIGS. 19A and 19B are illustrative drawings of a lubricating mechanism that opens and closes a lubricating mechanism by using a difference in rotating direction of the input/output driving shaft of FIG. 18 using spline fitting.
Figure 19B:
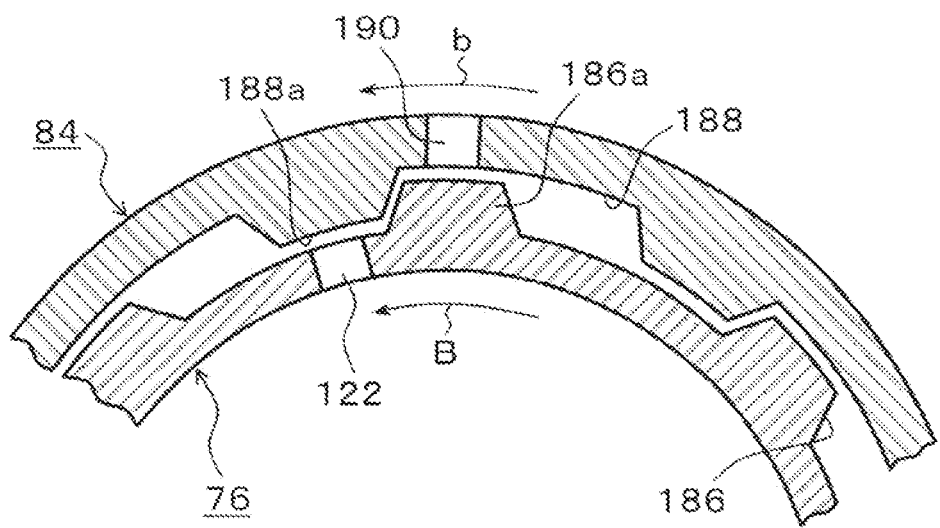

FIGS. 19A and 19B depict an extracted portion of a part of the input driving shaft 76a where the oil supply hole 122 of FIG. 18 is formed and a part of a section of a shaft portion of the inner hub 84. FIG. 19A depicts an operation state in the four-wheel drive mode.

In FIG. 19A, an outer-perimeter spline 186 is formed on an outer perimeter of the input driving shaft 76a. In the outer-perimeter spline 186, the length of a valley portion 186b in a circumferential direction is longer than the length of a ridge portion 186a in a circumferential direction. An inner-perimeter spline 188 is formed on the inner hub 84 disposed outside of the input driving shaft 76a. The inner-perimeter spline 188 is formed so that the length of a valley portion 188b in a circumferential direction is equal to the length of a ridge portion 188a in a circumferential direction. Therefore, the input driving shaft 76a and the inner hub 84 make a movement of relative rotation by a space with the outer-parameter spline 188 in a circumferential direction when the rotating direction is changed, thereby switching a lubricating-oil supply route. In the four-wheel drive mode of FIG. 19A, the input driving shaft 76a receives a driving force, and transmits the driving force to the inner hub 84. With the rotation of the input driving shaft 76a in a forward direction indicated by an arrow A, the ridge portion 186a of the outer-parameter spline 186 moves to and abuts on a position in contact with a right side of the ridge portion 188a of the inner-parameter spline 188 of the inner hub 84. With this, the inner hub 84 is rotated together with the input driving shaft 76a in a direction indicated by an arrow a. In this state, the oil supply hole 122 provided on the input driving shaft 76a in a diameter direction faces an oil supply hole 190 provided on a valley portion 188b of the inner hub 84. Oil from the oil pump 94 supplied to the oil chamber 185 inside of the input driving shaft 76a passes through the oil supply holes 122 and 190 facing at a released position for supply of lubricating oil to a space between the clutch plates of the multi-plate clutch mechanism.

FIG. 19B depicts a switching state in the two-wheel drive mode. In the two-wheel drive mode, since disconnection is made by the multi-plate clutch mechanism 30, the rotation of the left-rear wheel is transmitted to the input driving shaft 76a via the rear-wheel differential device, and the input driving shaft 76a rotates in reverse as indicated by an arrow B. For this reverse rotation, the input driving shaft 76a serves as a drive side to rotate the inner hub 84 in a reverse direction also indicated by an arrow B, with the ridge portion 186a of the inner-perimeter spline 186 abutting on a right side of the ridge portion 188a of the inner-perimeter spline 188 of the inner hub 84. Therefore, for reverse rotation of the input driving shaft 76a in the two-wheel drive mode, the oil supply hole 122 of the input driving shaft 76a is closed by the ridge portion 188a of the inner-perimeter spline 188a of the inner hub 84 to cut off communication with the oil supply hole 190. With this, the supply of lubricating oil from the oil pump to the multi-plate clutch mechanism is stopped, and drag torque in the multi-plate clutch mechanism can be approximately zero.

Figure 20:
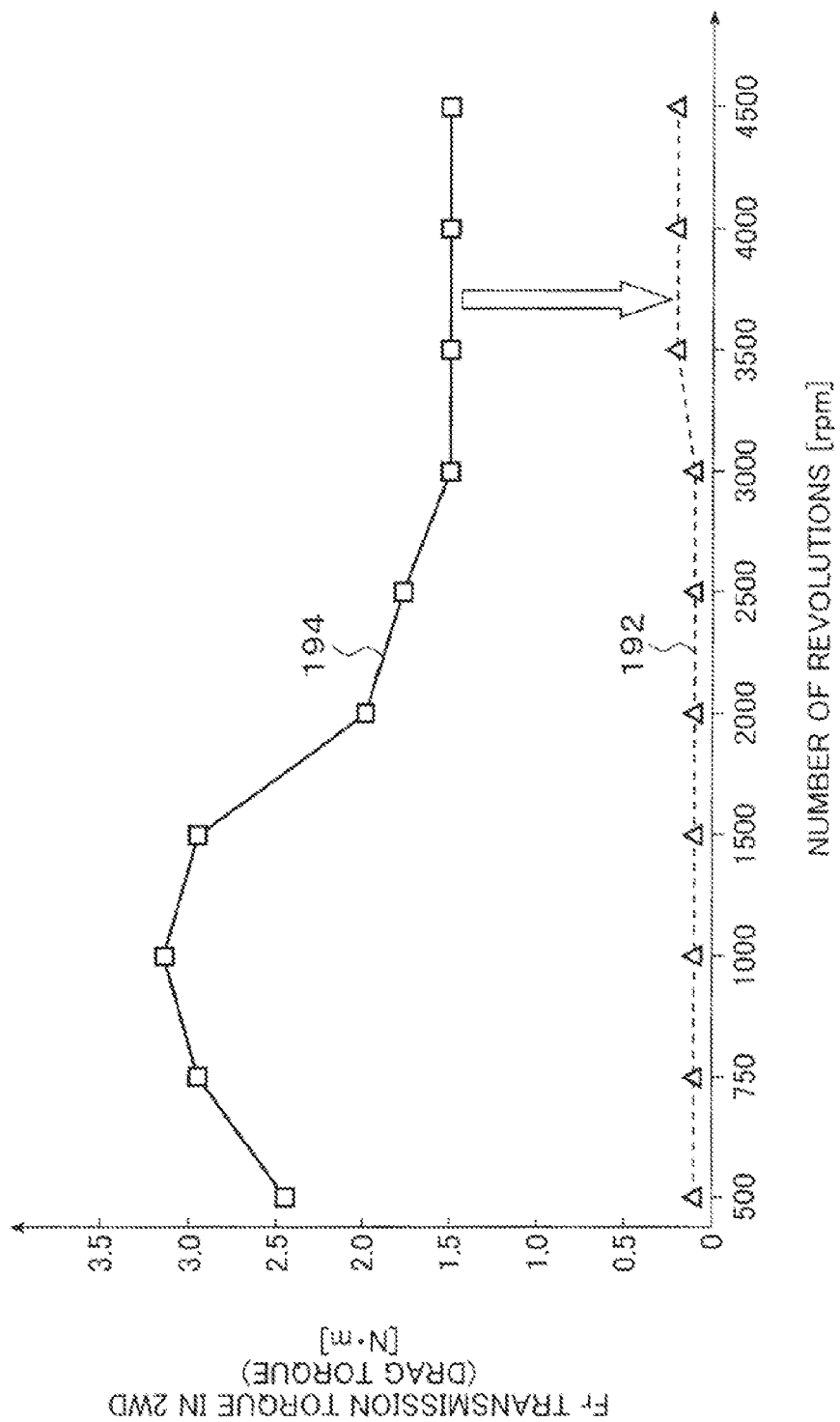
FIG. 20 is a graph diagram depicting changes in drag torque with respect to the number of revolutions of the multi-plate clutch mechanism when supply of lubricating oil is stopped, in comparison with a conventional example.

FIG. 20 is a graph diagram depicting changes in drag torque with respect to the number of revolutions of the multi-plate clutch mechanism when supply of lubricating oil is stopped in the two-wheel drive mode, in comparison with a conventional example. In FIG. 20, a characteristic 192 depicts changes in drag torque with respect to the number of revolutions when supply of lubricating oil is stopped in the two-wheel drive mode according to the present embodiment, and the drag torque can be kept near approximately zero. On the other hand, in a conventional characteristic 194 for supplying lubricating oil, a large drag torque occurs that has a peak near 1000 revolutions, decreases with respect to an increase of rotation, and then becomes approximately stable. It is confirmed that drag torque due to the stop of the supply of lubricating oil is sufficiently decreased. Here, as a structure for decreasing drag torque in the multi-plate clutch mechanism, other than stopping the supply of lubricating oil, incorporation of spacer springs for ensuring a space between the clutch plates and ensuring a space between the piston and the clutch plates depicted in FIG. 8 is similarly applied to embodiments other than the embodiment of FIG. 7.

Figure 1:
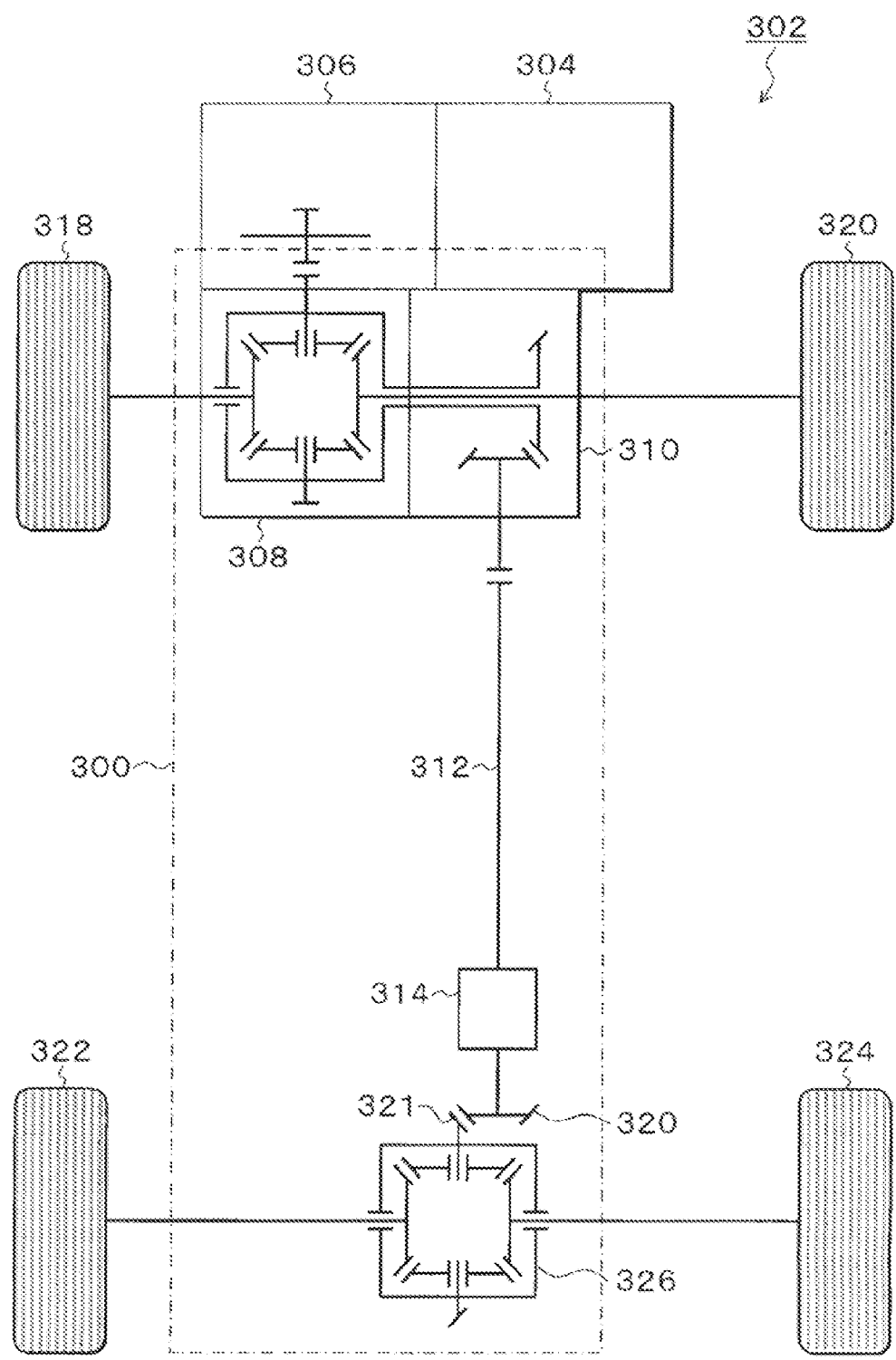
FIG. 1 is an illustrative diagram depicting a conventional driving-force transmitting apparatus for a four-wheel-drive vehicle.
Figure 2:
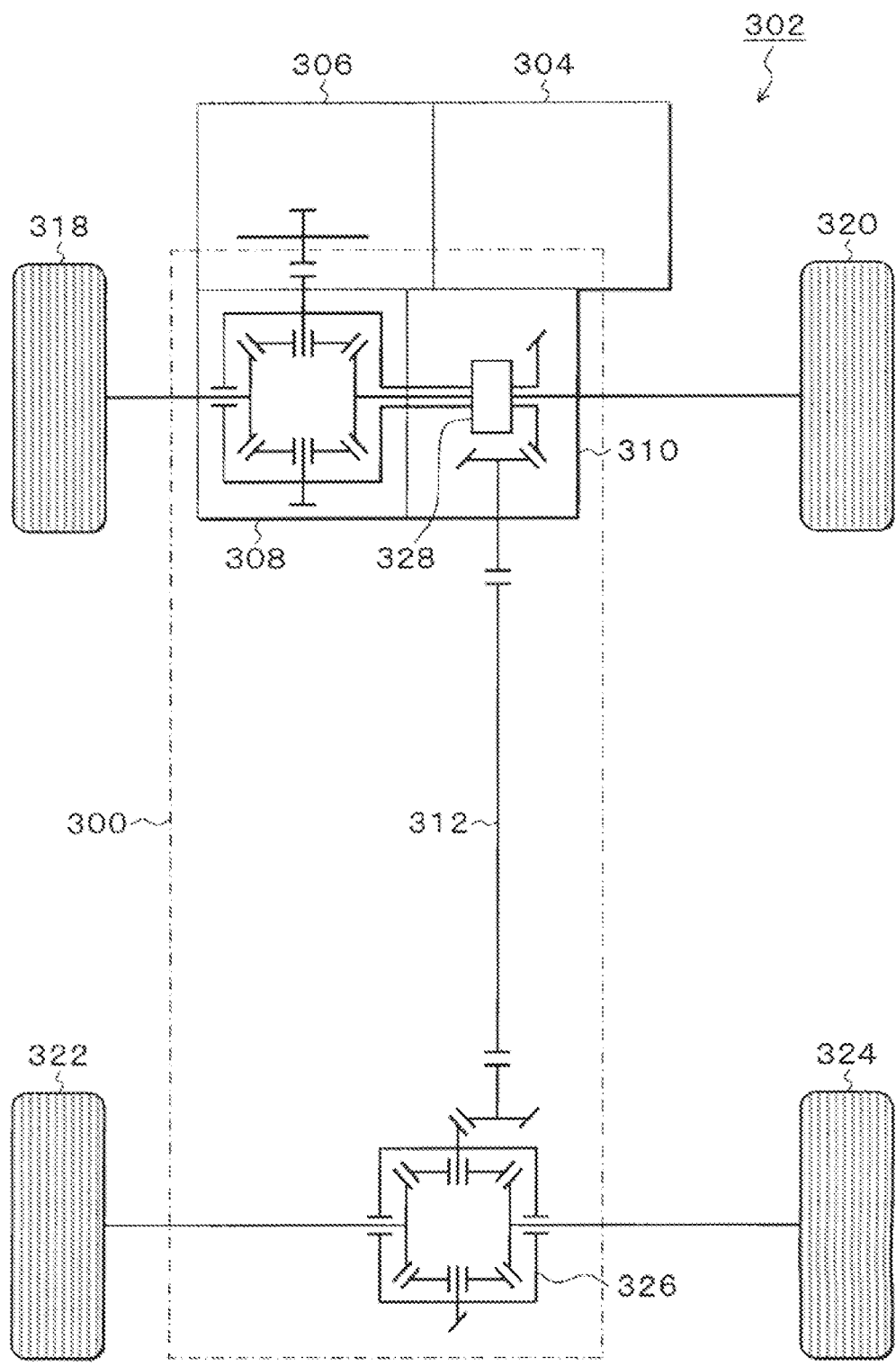
FIG. 2 is an illustrative diagram depicting a conventional driving-force transmitting apparatus for a four-wheel-drive vehicle.
Figure 3:
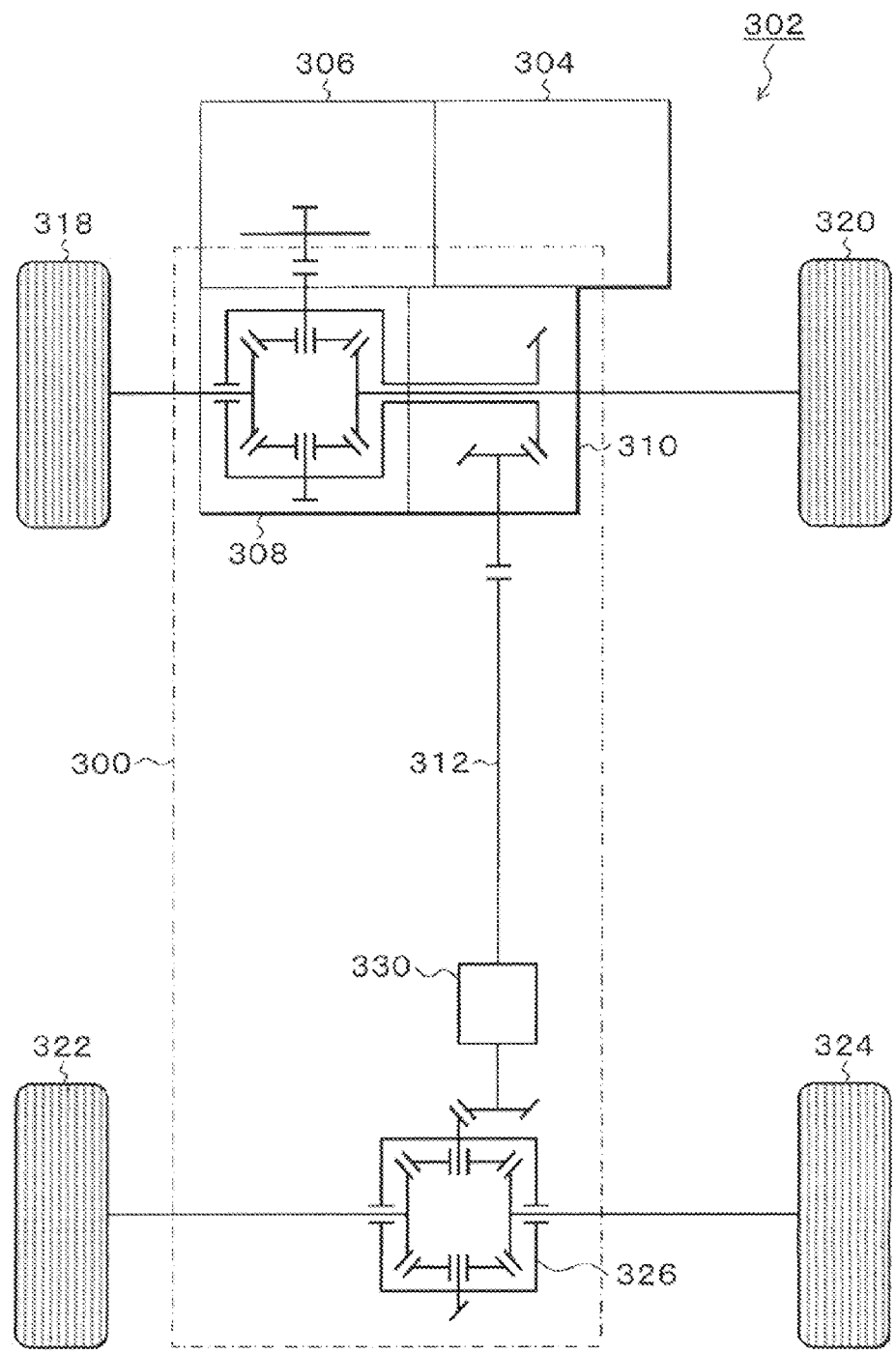
FIG. 3 is an illustrative diagram depicting a conventional driving-force transmitting apparatus for a four-wheel-drive vehicle using an electronic-control coupling device.
Figure 21:
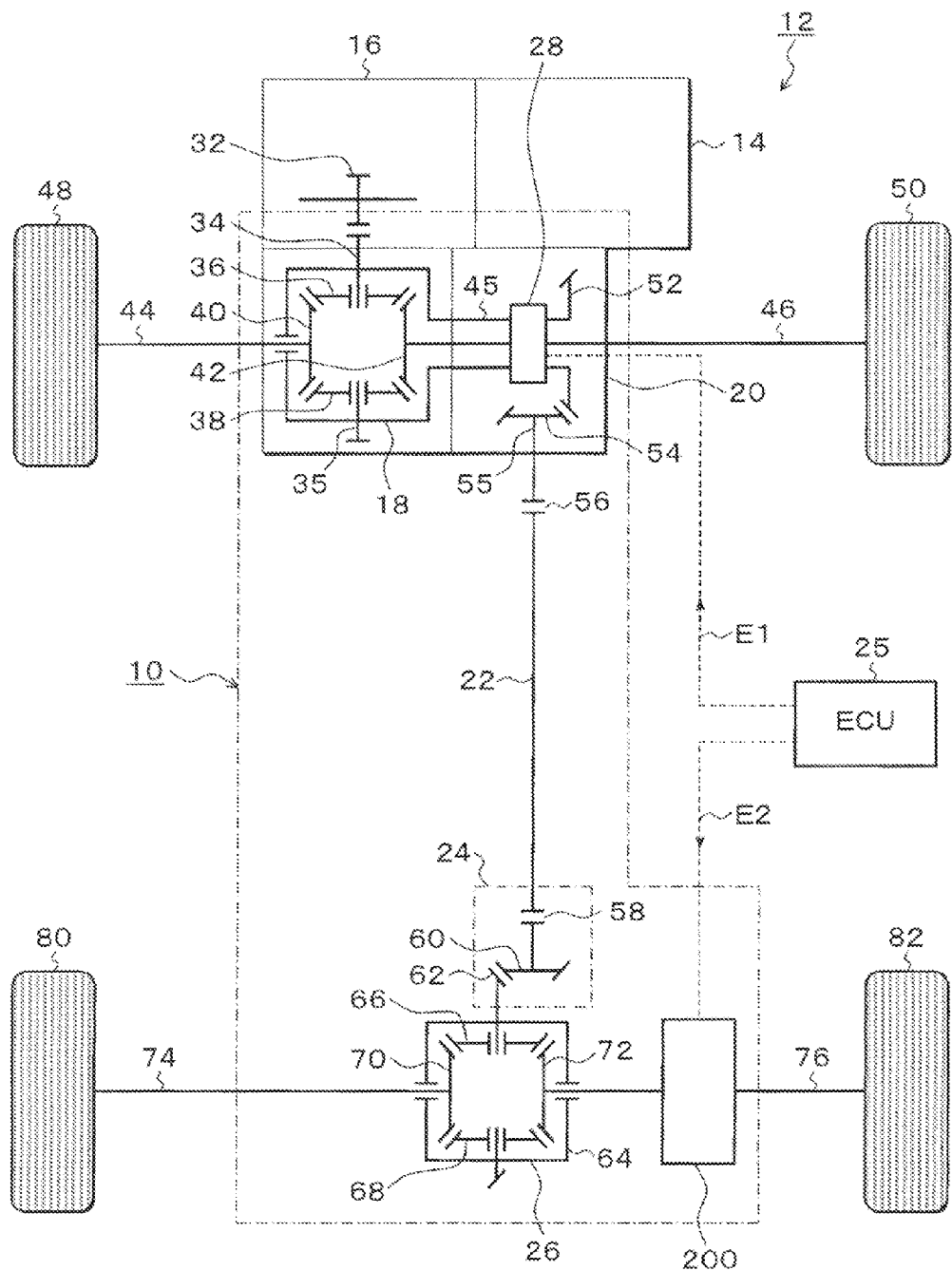
FIG. 21 is an illustrative diagram depicting an embodiment of a driving-force transmitting apparatus for a four-wheel-drive vehicle according to the present invention.

FIG. 21 is an illustrative diagram depicting an embodiment of a driving-force transmitting apparatus for a four-wheel-drive vehicle according to the present invention. In FIG. 21, the driving-force transmitting apparatus 10 of the present invention is provided to the FF-vehicle-based four-wheel-drive vehicle 12 in which front wheels are driven in the two-wheel drive mode, includes the front-wheel differential device 18, the first driving-force transmitting direction converting unit 20, the propeller shaft 22, the second driving-force transmitting direction converting unit 24, and the rear-wheel differential device 26, further has a first disengaging mechanism 28 incorporated in the first driving-force transmitting direction converting unit 20, and is provided with a second disengaging mechanism 200 between the rear-wheel differential device 26 and the right-rear wheel 82. Furthermore, to the first disengaging mechanism 28 and the second disengaging mechanism 200 of the driving-force transmitting apparatus 10, control signals E1 and E2 are given from an ECU (Electric Control Unit) functioning as a controller. The speed of the driving force from the engine 14 is changed by the change gear 16, and is then input from the drive gear 32 of the change gear 16 to the front-wheel differential device 18. Receiving a driving force from the engine, the front-wheel differential device 18 transmits a driving force to the left-front wheel 48 and the right-front wheel 50 from the engine. That is, the front-wheel differential device 18 is configured of the ring gear 34, a differential case 35, the pinions 36 and 38, and the side gears 40 and 42. Received by the ring gear 34, the driving force of the drive gear 32 of the change gear 16 drives the left-front-wheel driving shaft 44 and the right-front-wheel driving shaft 46 via the pinions 36 and 38 and the side gears 40 and 42, and rotates the left-front wheel 48 and the right-front wheel 50 for transmission of the driving force onto the road surface. When a difference in rotation speed occurs between the left-front wheel 48 and the right-front wheel 50 at the time of cornering or due to a change of a road surface state or the like, the front-wheel differential device 18 absorbs the rotation speed to provide the same torque to the left-front wheel 48 and the right-front wheel 50 for rotation. The driving force from the drive gear 32 of the change gear 16 is input to the first disengaging mechanism 28 provided in the first driving-force transmitting direction converting unit 20 via the ring gear 34 and the differential case 35 of the front-wheel differential device 18. In the two-wheel drive mode, the first disengaging mechanism 28 is in a cut-off state in which the driving force to a rear-wheel side is disconnected with an operation with a control signal E1 from the ECU 25. Therefore, in the two-wheel drive mode, the driving force from the engine 14 is disconnected by the first disengaging mechanism 28, and is not transmitted to the rear-wheel side from the gears 52 and 54 of the first driving-force transmitting direction converting unit 20 via the propeller shaft 22. On the other hand, in the four-wheel drive mode, the first disengaging mechanism 28 is in a connected state with the control signal E1 from the ECU 25 and, after converting via the bevel gear 52 and the output pinion 54 the driving-force transmitting direction of the driving force from the change gear 16 input via the front-wheel differential device 18, outputs the driving force to the rear-wheel output shaft 55. The driving force output from the rear-wheel output shaft 55 of the first driving-force transmitting direction converting unit 20 is transmitted to the drive pinion 60 of the second driving-force transmitting direction converting unit 24 via the universal joint 56, the propeller shaft 22, and the universal joint 58, and is transmitted from the drive pinion 60 to the ring gear 62 of the rear-wheel differential device 26. The second driving-force transmitting direction converting unit 24 converts the direction of the driving force from the propeller shaft 22 to a direction of an orthogonal rear-wheel axle for input to the rear-wheel differential device 26. The rear-wheel differential device 26 is configured of the ring gear 62, the differential case 64, the pinions 66 and 68, and the side gears 70 and 72, rotating the left-rear wheel 80 and the right-rear wheel 82 via the left-rear-wheel driving shaft 74 and the right-rear-wheel driving shaft 76 coupled to the side gears 70 and 72 for transmission of the driving force onto the road surface. In this embodiment, the second disengaging mechanism 200 is provided at some point of the right-rear-wheel driving shaft 76 coupling the rear-wheel differential device 26 and the right-rear wheel 82, disengaging the driving force to the right-rear wheel 82. In the two-wheel drive mode, the second disengaging mechanism 200 is controlled with a control signal E2 from the ECU 25 in the disconnected state to disengage the transmission of the driving force between the right-rear wheel 82 and the rear-wheel differential device 26. On the other hand, in the four-wheel drive mode, the second disengaging mechanism 200 is optimally controlled between a two-wheel drive state with the driving force being zero and a complete fastening state according to a signal from a vehicle-state detection sensor, thereby transmitting the driving force from the engine 14 to the right-rear wheel 82 via the rear-wheel differential device 26. That is, in the four-wheel drive mode, the rear-wheel differential device 26 effectively operates and, even when a difference in rotation speed occurs between the left-rear wheel 80 and the right-rear wheel 82 at the time of cornering or due to a change of a road surface state or the like, the rear-wheel differential device 26 absorbs the difference in rotation speed, thereby making it possible to provide the same torque to the left-rear wheel 80 and the right-rear wheel 82 for rotation. Here, as the first disengaging mechanism 28 provided to the first driving-force transmitting direction converting unit 20, an engaging clutch mechanism is used in the present embodiment, as will be described in detail further below, switching between a cut-off state in the two-wheel drive mode and a connected state in the four-wheel drive mode with a shift operation by the actuator. Also, as the second disengaging mechanism 200 provided on a rear-wheel side, a multi-plate clutch mechanism is used in the present embodiment, as will be described in detail further below. The multi-plate clutch mechanism is in a disconnected state in the two-wheel drive mode, and the multi-plate clutch mechanism successively adjusts the driving force in the four-wheel drive mode. Furthermore, control of the first disengaging mechanism 28 and the second disengaging mechanism 200 by the ECU 25 is as follows. (1) In switching from the two-wheel drive mode to the four-wheel drive mode, after the second disengaging mechanism 200 is connected with the control signal E2, the first disengaging mechanism 28 is connected with the control signal E1. (2) In switching from the four-wheel drive mode to the two-wheel drive mode, after the second disengaging mechanism 200 is disconnected with the control signal E2, the connection of the first disengaging mechanism 28 is released. Here, functions of the driving-force transmitting apparatus 10 in the two-wheel drive mode in the embodiment of FIG. 21 are described. In the two-wheel drive mode, with the control signals E1 and E2 of the ECU 25, the second disengaging mechanism 200 is first disconnected, and then the connection of the first disengaging mechanism 28 is released with the control signal E1. Therefore, while the driving force from the change gear 16 is input to the first disengaging mechanism 28 via the ring gear 34 and the differential case 35 of the front-wheel differential device 18, the first disengaging mechanism 28 is in a connection-released state, and therefore the driving force is not output to the rear-wheel output shaft 55 via the gears 52 and 54. On the other hand, since the second disengaging mechanism 200 provided on a rear-wheel side is also in a disconnected state with the control signal E2 from the ECU 25, the ring gear 62 of the rear-wheel differential device 26 does not rotate. With this, in the two-wheel drive mode, the rotation of the bevel gear 52 and the output pinion 54 of the first driving-force transmitting direction converting unit 20, the rear-wheel output shaft 55, the propeller shaft 22, the drive pinion 60 of the first driving-force transmitting direction converting unit 20, and further the ring gear 62 of the rear-wheel differential device 26 stops, thereby solving a problem of decreasing fuel efficiency due to friction loss because the rear-wheel drive system rotates in the two-wheel drive. For description in further detail, if the second disengaging mechanism 200 is not provided and the side gear 72 and the right-rear-wheel driving shaft 76 are coupled together in the two-wheel drive mode in FIG. 1, for example, when the side gears 70 and 72 rotate in the same direction at the same speed, the pinions 66 and 68 do not rotate (by themselves) but the ring gear 62 rotates. Also, even when there is a difference in rotation speed between the side gears 70 and 72, if the rotation is in the same direction, the ring gear 62 rotates although the rotation speed is changed. In this manner, when the ring gear 62 rotates, the coupled drive pinion 60 of the second driving-force transmitting direction converting unit 24, the universal joint 58, the propeller shaft 22, the universal joint 56, the rear-wheel driving shaft 55 of the first driving-force transmitting direction converting unit 20, the output pinion 54, and the bevel gear 52 rotate. With this rear-wheel driving-force transmitting system from the ring gear 62 to the bevel gear 52 rotating although the system is not required to rotate in the two-wheel drive mode, viscous drag of oil and friction loss of the bearing portion occur, thereby causing a loss in the driving force and inviting a decrease in fuel efficiency. To get around this, in the present invention, in the two-wheel drive mode, the input of the driving force from an engine 14 side and the transmission of the driving force from a wheel side are cut off by the first disengaging mechanism and the second disengaging mechanism 200, thereby preventing rotation of the rear-wheel driving-force transmitting system from the bevel gear 52 to the ring gear 62. That is, when the transmission of the driving force from the right-rear wheel 82 is disconnected by the second disengaging mechanism 200 to cut off the coupling between the side gear 72 and the right-rear-wheel driving shaft 76, the rotation of the right-rear wheel 82 is not transmitted to the side gear 72. Therefore, the rotation of the side gear 70 with the left-rear wheel 80 rotates the side gear 72 in a reverse direction via the pinions 66 and 68. At this time, since the rotational resistance from the drive pinion 60 leading to the ling gear 62 to the bevel gear 52 is larger than the rotational resistance of the pinions 66 and 68 and the side gear 72, the ring gear 62 does not rotate. Also, in the multi-plate clutch mechanism used as the second disengaging mechanism 200, the drag torque when the multi-plate clutch mechanism is in a disconnected state is set smaller than friction of the rear-wheel driving-force transmitting system from the ring gear 62 to the bevel gear 52, thereby stopping the rotation of the rear-wheel driving-force transmitting system. Next, when switching is made to the four-wheel drive mode, the second disengaging mechanism 200 is connected with the control signal E2 from the ECU 25, and then the first disengaging mechanism 28 is connected. In this four-wheel drive mode, with the first disengaging mechanism 28 being connected, the driving force from the change gear 16 rotates the bevel gear 52 via the first disengaging mechanism 28 in a connected state via the ring gear 34 and the differential case 35 of the front-wheel differential device 18 and, after the direction is converted by the output pinion 54, is input to the rear-wheel differential device 26 via the rear-wheel output shaft 55, the propeller shaft 22, and further the drive pinion 60. With the second disengaging mechanism 200 being connected, the rear-wheel differential device 26 effectively operates. Via the rear-wheel differential device 26, the driving force can be transmitted to the left-rear wheel 80 and the right-rear wheel 82 for rotation. As a matter of course, in either of the two-wheel drive mode and the four-wheel drive mode, the driving force from the drive gear 32 of the change gear 16 can be transmitted to the right-front wheel 48 and the left-front wheel 50 via the front-wheel differential device 18 for rotation.

Figure 22:
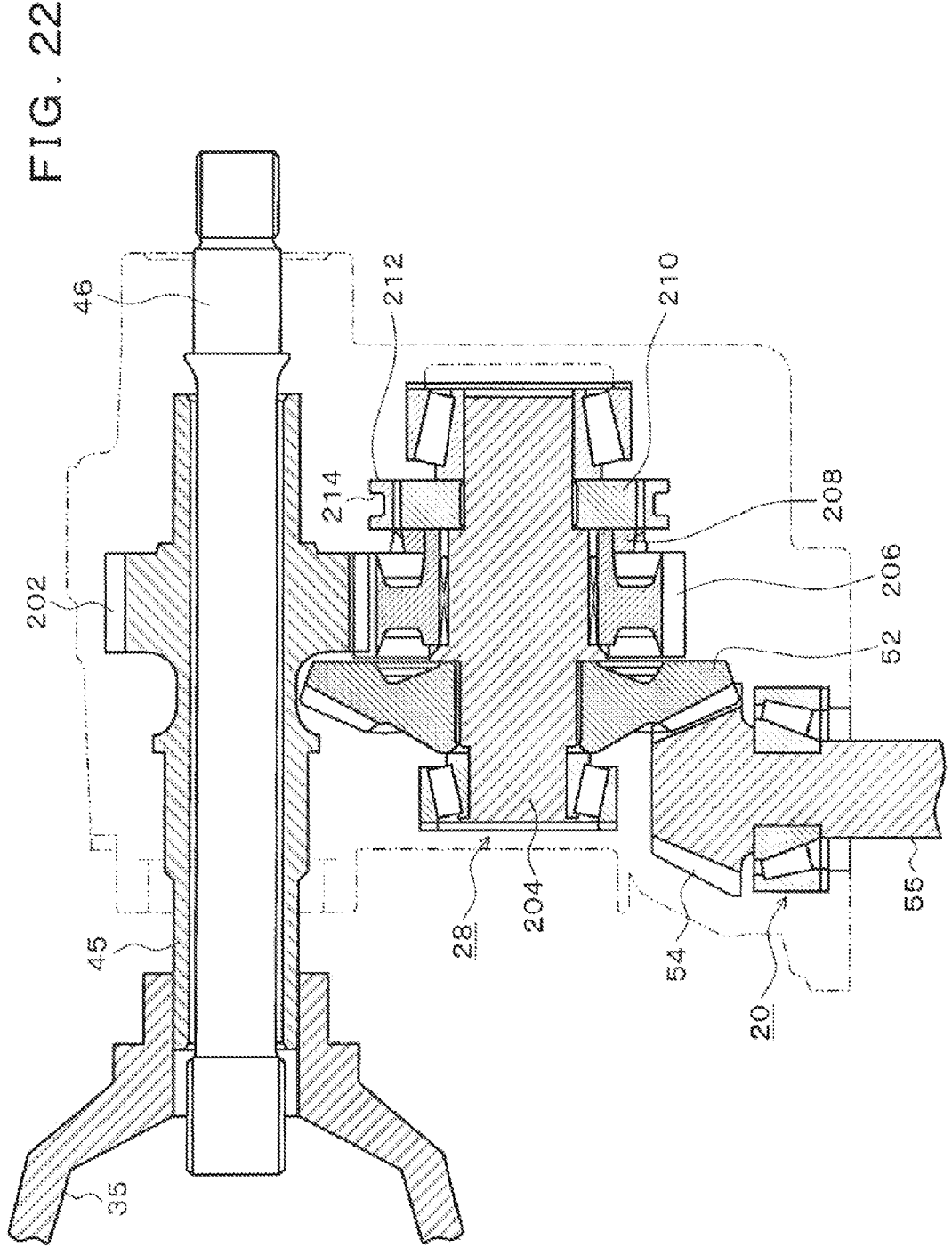
FIG. 22 is a section view depicting an embodiment of a first disengaging mechanism and a first driving-force transmitting direction converting unit of FIG. 1.

FIG. 22 is a section view depicting an embodiment of the first disengaging mechanism of FIG. 21 together with the first driving-force transmitting direction converting unit. In FIG. 22, the input shaft 45 of the first disengaging mechanism 28 is coupled on a right side of the differential case 35 of the front-wheel differential device 18. The input shaft 45 is a hollow shaft, and has the right-front-wheel driving shaft 46 rotatably penetrating therethrough. The input shaft 45 is provided integrally with a drive gear 202. With the drive gear 202, a driven gear 206 rotatably provided to a middle transmitting shaft 204 is engaged. A clutch gear 208 is fixed on a right side of the driven gear 206 provided to the middle transmitting shaft 204. A coupling gear 210 fixed to the middle transmitting shaft 204 is disposed on a right side of the clutch gear 208.

On an outer perimeter of the coupling gear 210, a coupling sleeve 212 having formed on its inner perimeter a gear spline is slidably disposed in an axial direction. With the driven gear 206, the clutch gear 208, and the coupling gear 210 provided to this middle transmitting shaft 204, an engaging clutch mechanism for disengaging the driving force in the first disengaging mechanism 28 is formed. Furthermore, the bevel gear 52 is fixed on a left side of the middle transmitting shaft 204 provided with the engaging clutch mechanism. With the bevel gear 52, the drive pinion 54 formed integrally with the rear-wheel output shaft 55 disposed in an orthogonal direction is engaged, thereby constructing the first driving-force transmitting direction converting unit 20.

Figure 23:
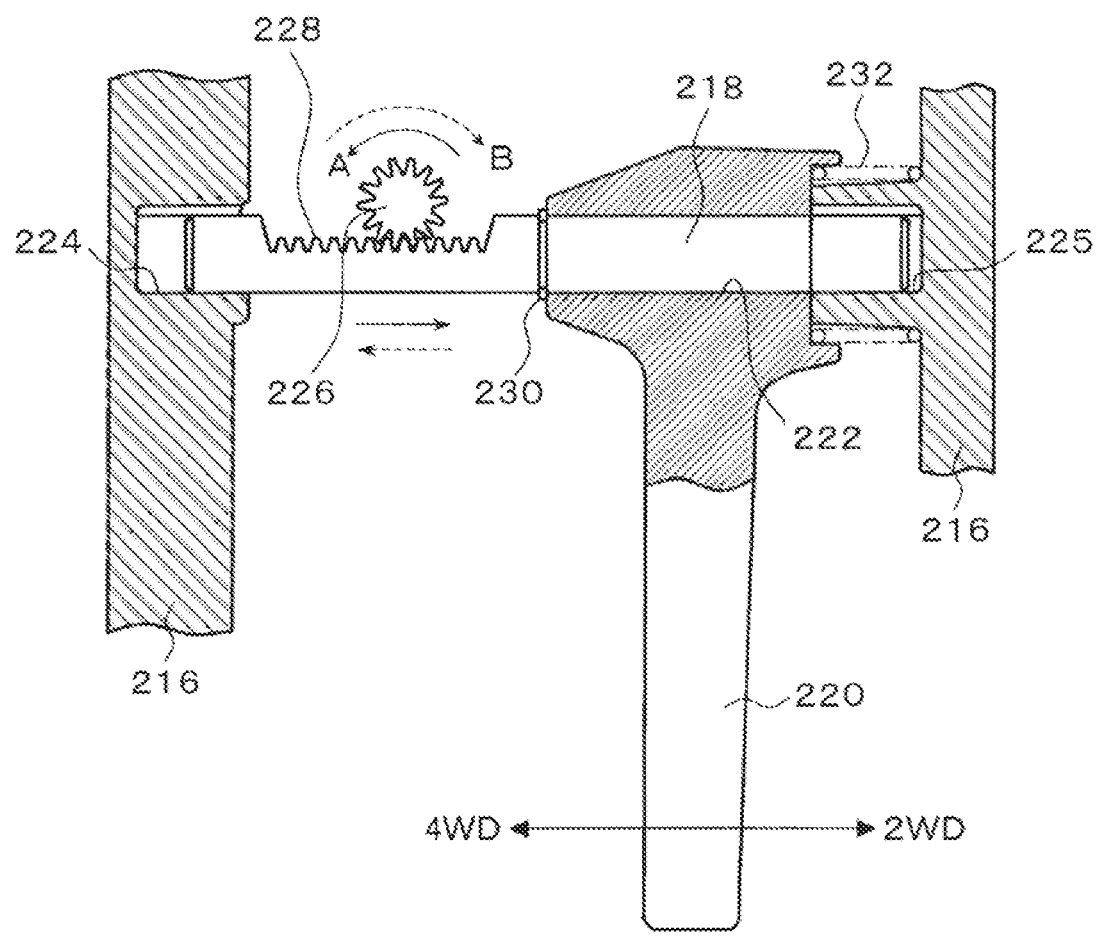
FIG. 23 is an illustrative diagram depicting an embodiment of an operation mechanism for use in the first disengaging mechanism of FIG. 22.

FIG. 23 is an illustrative diagram depicting an embodiment of an operation mechanism for use in switching of the engaging clutch mechanism provided to the first disengaging mechanism 28 of FIG. 22. This operation mechanism is characterized in that, as for switching between the two-wheel drive mode and the four-wheel drive mode, a wait mechanism is provided only on one side of switching to the four-wheel drive mode.

In FIG. 23, a shift rod 218 is slidably incorporated in shaft holes 224 and 225 provided to cases 216 facing each other. A shifting fork 220 is inserted in the shift rod 218, and a fork portion of the shifting fork 220 fits in a fork groove 214 of the coupling sleeve 212 depicted in FIG. 22. On a left side of the shift rod 218, a rack gear 228 is formed, where a pinion gear 226 is engaged. The pinion gear 226 is rotated in a horizontal direction by an actuator including a servo motor to move the shift rod 218 via the rack gear 228 to a 2WD switching position on a right side and a 4WD switching position on a left side. A retaining ring 230 is inserted on a left side of the shifting fork 220 disposed on the shift rod 218. On an opposite side, a spring 232 is disposed in a space formed with the case 216, always pressing the shifting fork 220 in a 4WD switching direction. In the operation mechanism of FIG. 23, when switching is made to the 2WD position for the two-wheel drive mode, the pinion gear 226 is rotated in an A direction by the servo motor of the actuator to move the shift rod 218 in a right direction. With this movement of the shift rod 218 in a right direction, the retaining ring 230 abuts on the shifting fork 220, which moves to the 2WD switching position while compressing the spring 232. With this movement of the shifting fork 220 in a right direction, the coupling sleeve 212 engaging with the clutch gear 208 depicted in FIG. 22 in a connected state is moved in a right direction to depart from the clutch gear 208, releasing the connection. On the other hand, in the four-wheel drive mode, the pinion gear 226 is rotated in an arrow B direction by the servo motor of the actuator to move the shift rod 218 in a left direction. When the shift rod 218 is moved in a left direction, the retaining ring 230 integrally moves in a left direction and, accordingly, the shifting fork 220 is pressed by the spring 232 to move in a left direction. With this motion of the shifting fork 220, the coupling sleeve 212 in FIG. 22 is pressed by the shifting fork 220 with the force of the spring 232 to be pressed onto the clutch gear 208. At this time, since there is a difference in rotation between a front-wheel side and a rear-wheel side, the coupling sleeve 212 is pressed onto a right side of the clutch gear 208 with the force of the spring 232, thereby becoming a wait state of waiting for engagement. In a wait state where the coupling sleeve 212 is pressed onto the clutch gear 208 by the spring 232, when the difference in rotation between the front-wheel side and the rear-wheel side disappears, the coupling sleeve 212 is pressed into the clutch gear 208 with the force of the spring 232 for engagement, thereby causing the engaging clutch mechanism to be in a connected state. Here, in the present embodiment, as depicted in FIG. 21, when switching is made from the two-wheel drive mode to the four-wheel drive mode, the ECU 25 connects the second disengaging mechanism 200 with the control signal E2, and then connects the first disengaging mechanism 28 with the control signal E1. Therefore, when the first disengaging mechanism 28 is connected by the operation mechanism including the wait mechanism of FIG. 23, the rear-wheel differential device 26 and the propeller shaft 22 are rotated via the second disengaging mechanism 200 having the rotation on a rear-wheel side coupled thereto. Furthermore, the middle transmitting shaft 204 is rotated via the rear-wheel output shaft 55 and the bevel gear 52. Since the vehicle is running, there is basically no difference in speed between front and rear wheels. When the coupling sleeve 212 is engaged in the clutch gear 208 with the operation mechanism of FIG. 23, there is little difference in rotation between the coupling sleeve 212 and the clutch gear 208. Receiving the force by the spring 232, the coupling sleeve 212 can be engaged in the clutch gear 208 for connection with a short rotation waiting time. On the other hand, when switching is made from the four-wheel drive mode to the two-wheel drive mode, the ECU 25 of FIG. 21 releases the connection of the first disengaging mechanism 28 after the coupling of the second disengaging mechanism 200 is released. Therefore, in the first disengaging mechanism 28 of FIG. 22, when the coupling sleeve 212 is removed from the clutch gear 208 by the operation mechanism of FIG. 23, the driving force from a rear-wheel side to the middle transmitting shaft 204 is in a released state via the rear-wheel output shaft 55, the bevel gear 54, and the bevel gear 52, and the driving force with the engagement between the clutch gear 208 and the coupling sleeve 212 is not transmitted. Therefore, with the movement of the shift rod 218 with the rotation of the pinion gear 226 in the A direction by the servo motor of the actuator depicted in FIG. 23, the coupling sleeve 212 can be directly removed from the clutch gear 208 with a light force. In this manner, in the engaging clutch mechanism provided to the first disengaging mechanism 28 of the present embodiment, a wait mechanism with the spring 232 can be provided only when the operation mechanism depicted in FIG. 23 is switched to one side of a 4WD side. Therefore, the operation mechanism can be made with an extremely simple structure, thereby simplifying the structure of the actuator disengaging the first disengaging mechanism, and achieving downsizing and light weight.

Figure 24A:
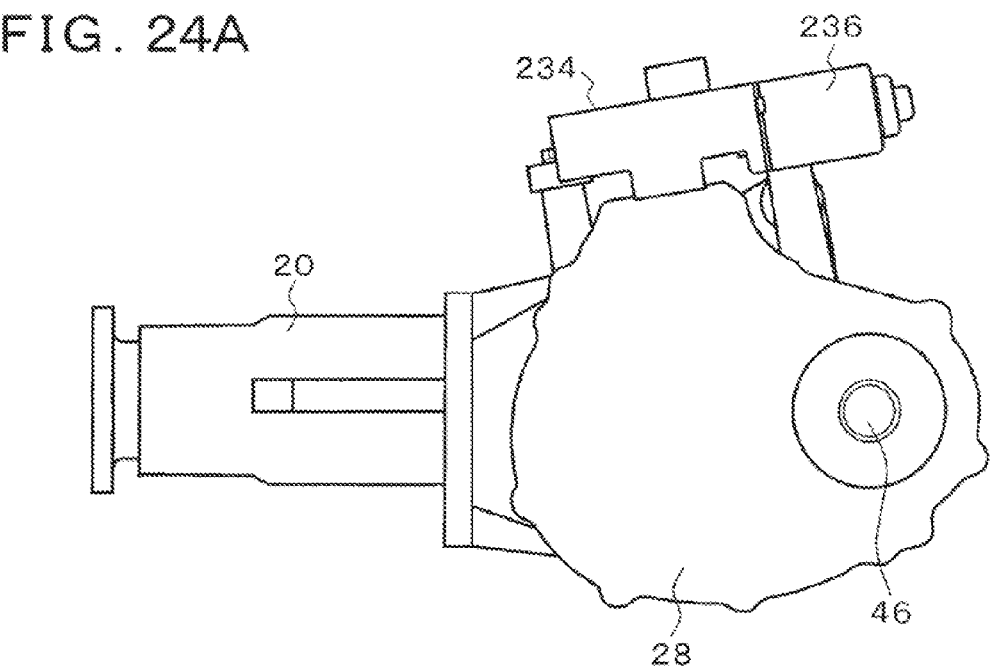
FIGS. 24A and 24B are illustrative diagrams depicting an outer view of the first disengaging mechanism and the first driving-force transmitting direction converting unit of FIG. 22.
Figure 24B:
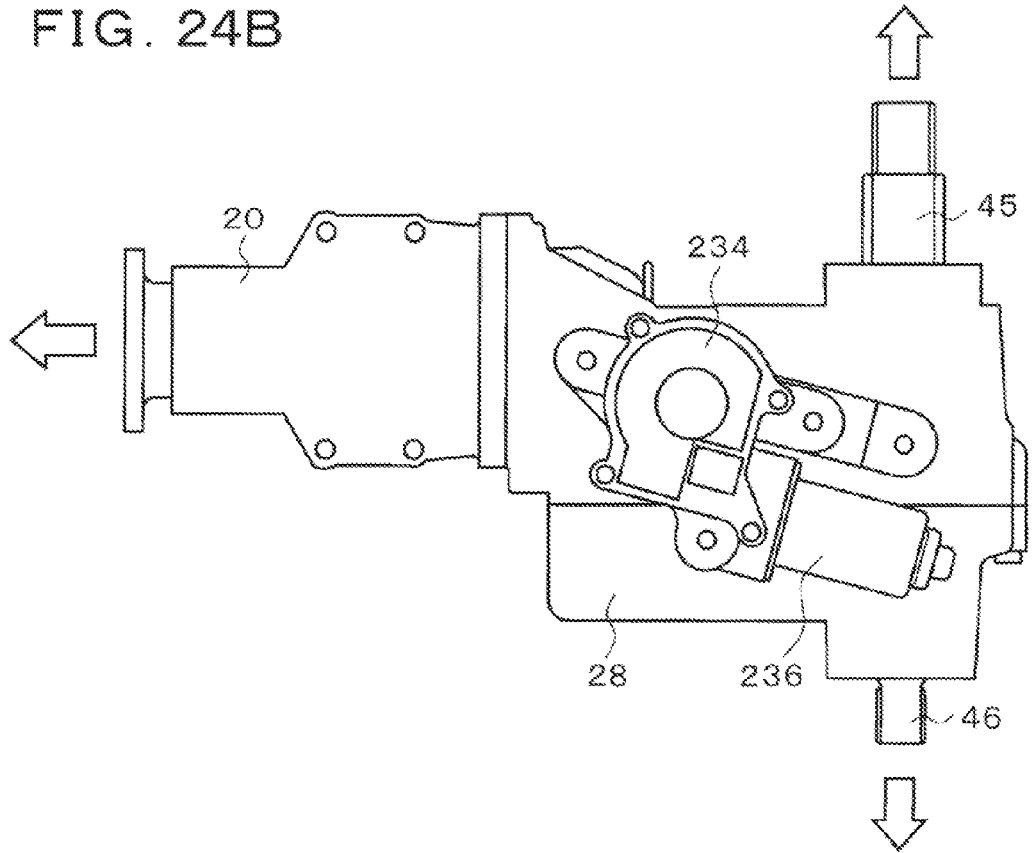

FIGS. 24A and 24B are illustrative diagrams depicting an outer view of the first disengaging mechanism and the first driving-force transmitting direction converting unit of FIG. 22. FIG. 24A depicts a state viewed from a lateral direction in a vehicle-mounted state, and FIG. 24B depicts a state in a plan direction viewed from top. In FIGS. 24A and 24B, the first disengaging mechanism 28 takes out, to a left side, the input shaft 45 having the differential case of the front-wheel differential device coupled thereto, and the right-front-wheel driving shaft 46 rotatably penetrates through the input shaft 45. The first driving-force transmitting direction converting unit 20 is mounted in the rear of the first disengaging mechanism 28. An actuator 234 including a servo motor 236 is loaded above the first disengaging mechanism 28. The actuator 234 has a worm decelerator and a position switch not shown incorporated therein. With the servo motor 236, the pinion gear 226 of FIG. 23 is rotated. With the motion of the shift rod 218, the shifting fork 220 is operated to disengage the engaging clutch mechanism depicted in FIG. 22 constructing the first disengaging mechanism. In this manner, the operation mechanism of the actuator 234 for use in disengaging the first disengaging mechanism 28 can be simplified to achieve downsizing and light weight. With this, actuator 112 is disposed above a transfer including the first disengaging mechanism 28 and the first driving-force transmitting direction converting unit 20 to sufficiently enhance vehicle-mount layout flexibility.

Figure 25:
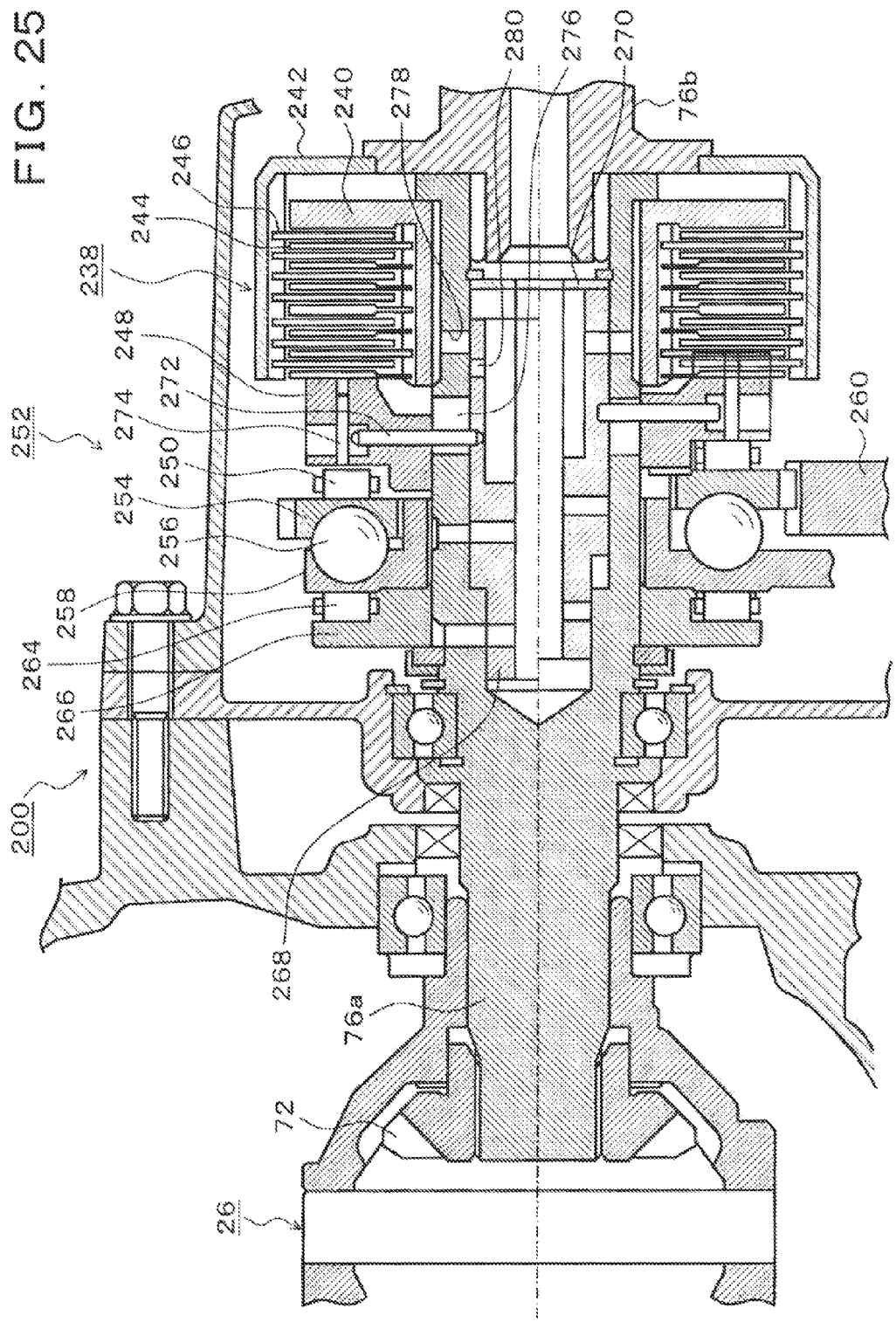
FIG. 25 is a section view depicting an embodiment of a second disengaging mechanism of FIG. 21.

FIG. 25 is a section view depicting an embodiment of the second disengaging mechanism disposed on a rear-wheel side of FIG. 21. The present embodiment is characterized in that a multi-plate clutch mechanism is used as a second disengaging mechanism. In FIG. 25, the right-rear-wheel driving shaft coupled to the side gear 72 of the rear-wheel differential device 26 is divided into the input driving shaft 76a on a left side to which the driving force is input and the output driving shaft 76b on a right side from which the driving force is output, and a multi-plate clutch mechanism 238 is provided therebetween that forms a second disengaging mechanism 30. The multi-plate clutch mechanism 238 has an inner hub 240 fixed to an outer perimeter on a shaft end side of the input driving shaft 76a, has disposed outside thereof an outer hub 242 coupled to the output driving shaft 76b, and has disposed a plurality of clutch plates 244 and 246 alternately fitting in the inner hub 240 and the outer hub 242. On a left side of the multi-plate clutch mechanism 238, a ball cam mechanism 252 is provided that performs clutch fastening and disconnection. In the ball cam mechanism 252, on a right side of a fixing plate 258 fixed to an outer perimeter of the input driving shaft 76a, a rotation cam plate gear 254 is movably disposed in an axial direction via a ball 256. On a right side of the rotation cam plate gear 254, via a thrust bearing 250, a piston 126 is movably disposed in an axial direction with respect to the clutch plates 244 and 246 of the multi-plate clutch mechanism 238. Also, on a left side of the fixing cam plate 258, a fixing plate 266 is disposed via a thrust bearing 264 to receive a reaction force when a piston 248 is pressed. On a lower side of the rotation cam plate gear 254 of the ball cam mechanism 252, a drive gear 260 rotated by an actuator using a servo motor is engaged. The ball cam mechanism 252 is configured of a cam groove provided in a circumferential direction on end surfaces of the fixing cam plate 258 and its facing rotation cam plate gear 254 and a ball 256 fitting in the cam groove. The depth of the cam groove formed in the circumferential direction forms a tapered groove in the circumferential direction with the depth of the groove linearly varied toward the circumferential direction. Here, in the section view of FIG. 25, a side above a center line depicts a clutch-disconnected state in which the multi-plate clutch mechanism 238 is released, and a side below the center line depicts a clutch-fastened state in which the multi-plate clutch mechanism 238 is fastened. That is, when the rotation cam plate gear 254 in the ball cam mechanism 252 is at a rotating position depicted on the side above the center line, the ball 256 is at the deepest position in the cam groove in the circumferential direction. Therefore, the piston 248 is returned to a left side, and the state becomes a clutch-disconnected state in which the pressing of the clutch plates 244 and 246 is released, thereby disconnecting transmission of the driving force between the input driving shaft 76a and the output driving shaft 76b. On the other hand, when the rotation cam plate gear 254 is rotated at a predetermined angle with the rotation of the cam drive gear 260 by the actuator, as depicted on the side below the center line, the ball 256 comes to the shallowest position in the cam groove to move the rotation cam plate gear 254 to a right side. With this, the piston 248 is pushed to press the clutch plates 244 and 246 in the multi-plate clutch mechanism 238 to cause a clutch-fastened state, thereby transmitting the driving force between the input driving shaft 76a and the output driving shaft 76b. The operation state of the ball cam mechanism 252 and the multi-plate clutch mechanism 238 at this clutch-fastened time can further become apparent with reference to FIG. 26 extracting and depicting the side below the center line of FIG. 25. In the second disengaging mechanism 200 of the present embodiment using the multi-plate clutch mechanism 238 depicted in FIG. 25, a structure is adopted in which drag torque of the multi-plate clutch mechanism 238 in a disconnected state, that is, drag torque causing friction loss due to viscous drag of oil occurring from a difference in rotation speed between the clutch plates 244 and 246 and a contact between the clutch plates in a clutch-disconnected state as depicted in the side above the center line of FIG. 25, is smaller than a friction torque of the rear-wheel driving-force transmitting system from the ring gear 62 to the bevel gear 52 depicted in FIG. 21. As a structure for decreasing drag torque at clutch disconnection in this multi-plate clutch mechanism 238, the following three structures are adopted in the present embodiment.

Figure 26:
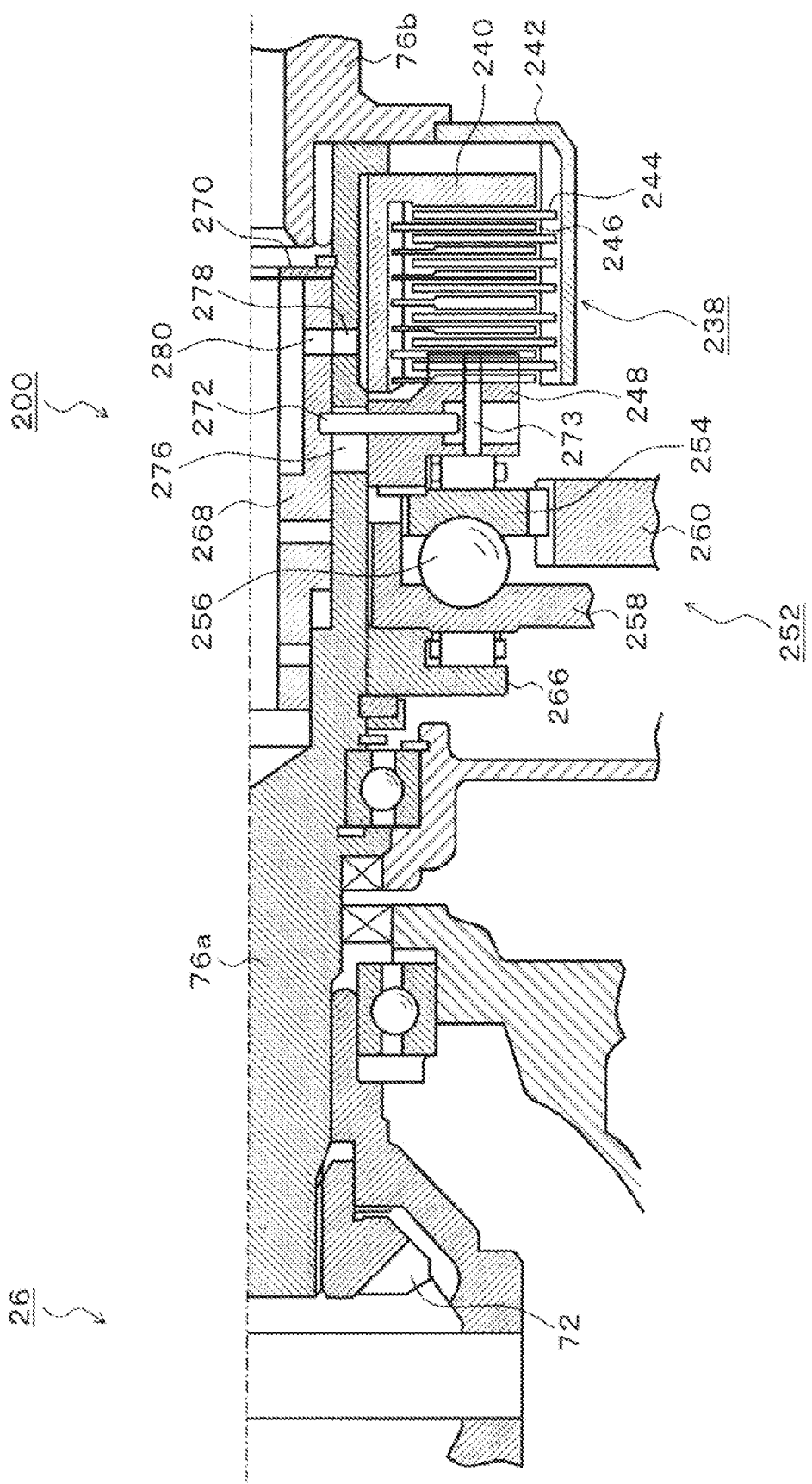
FIG. 26 is a section view depicting that a portion in a clutch-fastened state on a lower side of a center line in the second disengaging mechanism of FIG. 25 is removed.

(1) A spring member is provided that presses in a direction of widening a space between the clutch plates 244 and 246.
(2) A spring member is provided between the piston 248 and the clutch plate 246 to widen a space therebetween.
(3) A valve mechanism is provide that cuts off the supply of oil to the clutch plates 244 and 246 at a retracted position (disconnected position) of the piston 248 and supplies oil to the clutch plates 244 and 246 at a clutch-fastened position where the piston 248 advances. First, as a valve mechanism for controlling oil supply to the clutch plates 244 and 246 of the multi-plate clutch mechanism 238, in the present embodiment, as depicted in FIG. 26, in a shaft hole with steps formed from a right side of the input driving shaft 76a, a valve member 268 also shaped like a cylinder with steps is slidably disposed in an axial direction, with its right side provided with a stopper 270 to prevent dislocation. A port 280 is formed on a right side of the valve member 268. Correspondingly to this port 280, in the input driving shaft 76a serving as an insertion portion of a clutch hub 240, an oil supply hole 278 penetrating from the inside to the outer perimeter is formed. The valve member 268 is coupled to the piston 248 with a rod 272. The rod 272 passes through a longitudinal hole 276 in an axial direction opening at a portion of the input driving shaft 76a to be coupled to the valve member 268. According to the movement of the piston 248 in an axial direction by the ball cam mechanism 252, the valve member 268 can be moved in an axial direction via the coupling pin 272. Here, the coupling pin 272 is prevented from dislocation by a stopper pin 273 put in an upper portion in an axial direction. Also, an oil pump (not shown) is provided on an output driving shaft 76a side for pressure feed of oil to the shaft hole having the valve member 268 accommodated therein. In a disconnected state of the multi-plate clutch mechanism 238 on the side above the center line in FIG. 25, the piston 248 is at a retracted position on a left side by the ball cam mechanism 252. At this time, the valve member 268 inside is also at a position after moving to a left side via the coupling pin 272. The port 280 of the valve member 268 is at a closed position off the oil supply hole 278 on the clutch hub 240 side. Therefore, in a disconnected state of the multi-plate clutch mechanism 238, oil is not supplied to the oil supply hole 278 from the inside of the shaft, thereby suppressing the occurrence of drag torque because oil enters a space between the clutch plates 224 and 226 in a released state to cause viscous drag. On the other hand, as depicted in the side below the center line in FIG. 25 and extracted in FIG. 26, when the piston 248 is pushed to a right side by the ball cam mechanism 252 to cause the clutch plates 224 and 226 of the multi-plate clutch mechanism 238 in a fastened state, according to the movement of the piston 248 to a right side, the valve member 268 also moves via the coupling pin 272 to a right-side position abutting on the stopper 270. At this position, the port 280 of the valve member 268 opens a flow path, facing the oil supply hole 278 on a clutch hub 240 side. Oil is supplied to the clutch plates 244 and 246 in a fastened state due to the pressing by the piston 248, thereby cooling frictional heat and the like due to sliding of the clutch plates. In particular, in the multi-plate clutch mechanism 238 of the present embodiment, in the four-wheel drive mode, the ECU depicted in FIG. 21 changes a fastening force, that is, torque transmission, to the multi-plate clutch mechanism 238 so as to control torque distribution between the front wheels and the rear wheels according to the driving state. Therefore, in the four-wheel drive mode, the clutch-fastening force, that is, transmission torque, by the piston 248 is controlled in a clutch-fastened state. With the occurrence of a sliding state of the clutch plates 244 and 246, oil is supplied from the port 280 through the oil supply hole 278 for abrasion of the clutch plates due to friction contact and appropriate cooling.

Figure 27:
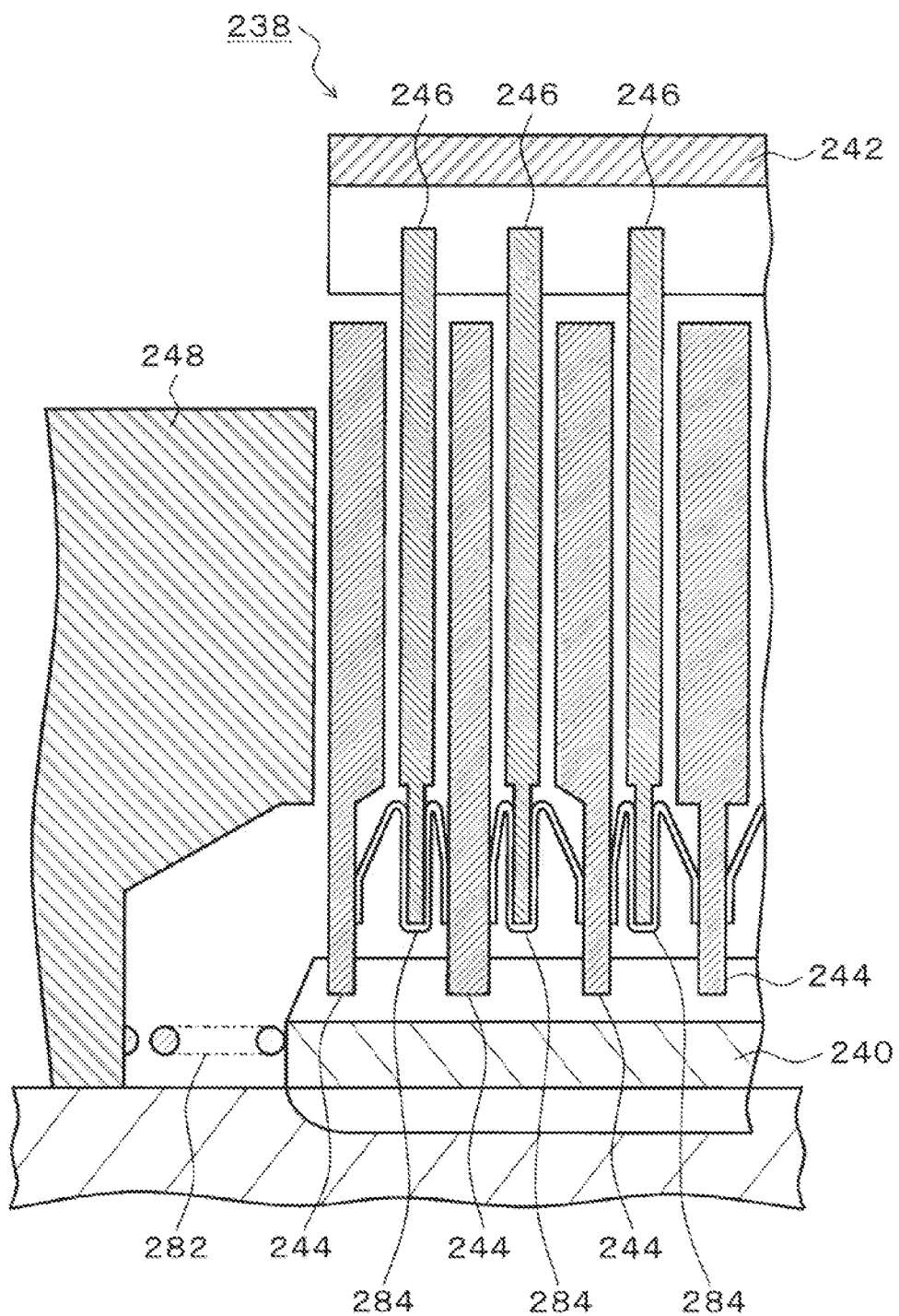
FIG. 27 is an illustrative diagram depicting amount state of spring members for ensuring space in the multi-plate clutch mechanism of FIG. 25.

FIG. 27 is an illustrative diagram depicting amount state of spring members for ensuring space in the multi-plate clutch mechanism of FIG. 25. In FIG. 27, to ensure a space at the time of clutch release between the clutch plate 244 mounted on an inner hub 240 side and the clutch plate 246 mounted on an outer hub 242 side in the multi-plate clutch mechanism 238, a clutch spring spacer 284 is disposed as a spring member at an end of the clutch plate 246 on an inner perimeter side to ensure a space between the clutch plates 244 and 246. Also, between an end face of the piston 248 on an inner perimeter side and a facing end face of the inner hub 240, a piston spring spacer 282 is disposed using a coil spring, thereby ensuring a space between the piston 248 and the clutch plate 244 in a clutch-disconnected state to suppress the occurrence of drag torque due to a contact therebetween.

Figure 28:
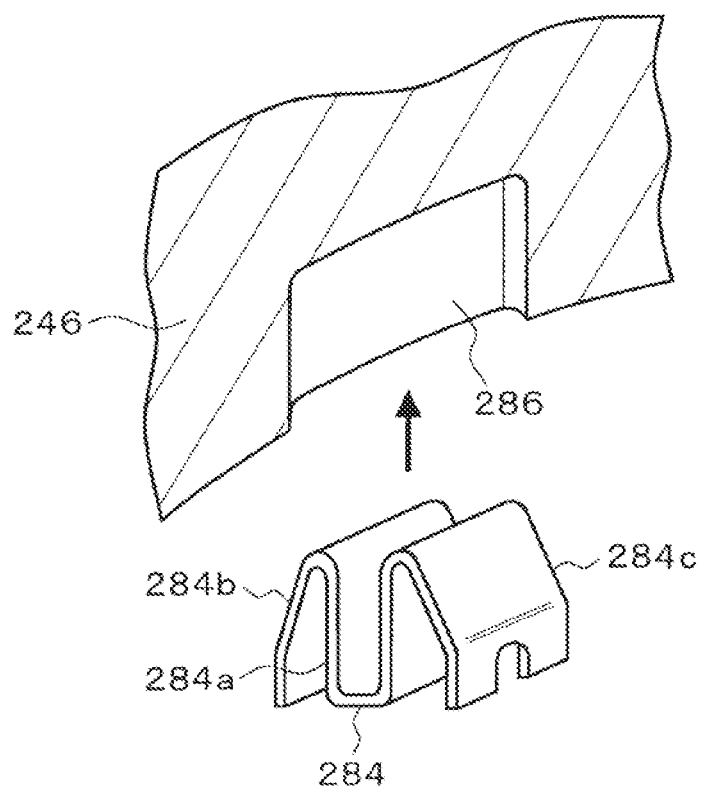
FIG. 28 is an exploded assembly view of a mount structure of the spring members on clutch plates of FIG. 27.

FIG. 28 is an exploded assembly view of a mount structure of the spring members on the clutch plates of FIG. 27. In FIG. 28, on an inner perimeter side of the clutch plate 246 on an outer hub 242 side, a spacer accommodating portion 286 is formed to be evenly spaced at a plurality of positions in a circumferential direction, where a clutch spring spacer 284 fits from the inside. The clutch spring spacer 284 has an elastic piece 284b folded in a mount shape and formed on both sides of a center display portion 284a. By fitting the display portion 284a in the spacer accommodating unit 286 for fixing, projected portions of the elastic piece 284b abut on the clutch plates 244 positioned at both sides on a spacer hub 240 side to form a predetermined space between the clutch plates 244 and 246 in a clutch-released state, thereby decreasing the occurrence of drag torque due to a contact between the clutch plates. This structure of FIG. 28 is basically the same as that of FIG. 9. Here, as depicted in FIG. 21, while the case is taken as an example in the present embodiment in which the second disengaging mechanism 200 using a multi-plate clutch mechanism as the right-rear-wheel driving shaft 76 between the rear-wheel differential device 26 and the right-rear wheel 82 is disposed, the second disengaging mechanism 200 may be provided to the left-rear-wheel driving shaft 76 between the rear-wheel differential device 26 and the left-rear wheel 80. Furthermore, the second disengaging mechanism 30 may be provided to both of the right-rear-wheel driving shaft 76 and the left-rear-wheel driving shaft 74. Also, by way of example, although the ball cam mechanism 25 is taken as a mechanism for disengaging the multi-plate clutch mechanism 238 depicted in FIG. 25, the multi-plate clutch mechanism 238 including a driving unit of an oil-hydraulic piston type capable of driving the piston 248 with oil pressure supplied from an oil-hydraulic pump to control fastening torque may be taken. Still further, the present invention is not restricted to the above-described embodiments and includes appropriate modifications that do not impair the objects and advantages and, furthermore, is not restricted by the numerical values in the above-described embodiments.

What is claimed is:

1. A driving-force transmitting apparatus for a vehicle capable of switching between a four-wheel drive mode in which distribution of a driving force to be transmitted to front wheels and rear wheels is automatically controlled according to a running condition and a two-wheel drive mode in which the driving force is transmitted only to the front wheels, the driving-force transmitting apparatus comprising:
   a front-wheel differential device that, upon receiving a driving force from an engine, distributes the driving force to left and right front wheels;
   a first driving-force transmitting direction converting unit that changes a rotating direction of the driving force from the engine for transmission to the rear wheels;
   a rear-wheel differential device that distributes the driving force to left and right rear wheels;
   a second driving-force transmitting direction converting unit that, upon receiving the driving force from the first driving-force transmitting direction converting unit, changes a rotating direction for transmission to the rear-wheel differential device;
   a disengaging device that disengages the driving force to the first driving-force transmitting direction converting unit;
   a multi-clutch mechanism provided between one of outputs of the rear-wheel differential device and one of the left and right rear wheels, the multi-clutch mechanism capable of successively adjusting a fastening force;
   a drag-torque decreasing mechanism that sets drag torque when fastening of the multi-plate clutch mechanism is released to be smaller than friction torque between the first driving-force transmitting direction converting unit and the second driving-force transmitting direction converting unit; and
   a controller that disconnects the disengaging device and releases the fastening force of the multi-plate clutch mechanism in the two-wheel drive mode to stop rotation of the second driving-force transmitting direction converting unit from the first driving-force transmitting direction converting unit, and connects the disengaging device and adjusts the fastening force of the multi-plate clutch mechanism according to the running condition of the vehicle in the four-wheel drive mode,
   wherein the rear-wheel differential device and the multi-plate clutch mechanism are separated from each other as different units so that lubricating oil of the rear-wheel differential device and lubricating oil of the multi-plate clutch mechanism do not mix together.

2. The driving-force transmitting apparatus according to claim 1, wherein the drag-torque decreasing mechanism includes a lubricating-oil supply mechanism that sets a space between clutch plates wider than a predetermined value and stops or restricts supply of lubricating oil to the clutch plates in the two-wheel drive mode where the multi-plate clutch mechanism is disconnected and that supplies the lubricating oil to the clutch plates in the four-wheel drive mode where the multi-plate clutch mechanism is fastened.

3. The driving-force transmitting apparatus according to claim 2, wherein the lubricating-oil supply mechanism is provided with an oil pump that rotates in reverse in the two-wheel drive mode and that is driven by an output shaft of the rear-wheel differential device that rotates forward in the four-wheel drive mode.

4. The driving-force transmitting apparatus according to claim 3, wherein the oil pump is a gear pump, and an anti-seizing processed layer is formed on a sliding contact surface with a housing of the gear pump.

5. The driving-force transmitting apparatus according to claim 3, wherein the oil pump is driven via a one-way clutch provided in a space with the output shaft of the rear-wheel differential device, and
   in the two-wheel drive mode, the one-way clutch is idled to stop supply of the lubricating oil to the multi-plate clutch mechanism and, in the four-wheel drive mode, the oil pump is rotated forward to supply the lubricating oil to the multi-plate clutch mechanism.

6. The driving-force transmitting apparatus according to claim 2, wherein the lubricating-oil supply mechanism includes:
   an oil pump that is driven by an output shaft of the rear-wheel differential device that rotates in reverse in the two-wheel drive mode and rotates forward in the four-wheel drive mode;
   a first suction-path check valve that causes the oil pump to suck the lubricating oil from a first suction path at a time of reverse rotation in the two-wheel drive mode;
   a first discharge-path check valve that causes the lubricating oil discharged from the oil pump to be discharged to a region other than the multi-plate clutch mechanism at the time of reverse rotation in the two-wheel drive mode;
   a second suction-path check valve that causes the oil pump to suck the lubricating oil from a second suction path at a time of forward rotation in the four-wheel drive mode; and
   a second discharge-path check valve that causes the lubricating oil discharged from the oil pump to be discharged to the multi-plate clutch mechanism at the time of forward rotation in the four-wheel drive mode.

7. The driving-force transmitting apparatus according to claim 2, wherein the lubricating-oil supply mechanism includes:

an oil pump that is driven by an output shaft of the rear-wheel differential device that rotates in reverse in the two-wheel drive mode and rotates forward in the four-wheel drive mode;

a suction-path check valve that causes the oil pump to suck the lubricating oil from a first suction path for discharge to a tank through a discharge and suction path at a time of reverse rotation in the two-wheel drive mode; and a discharge-path check valve that causes the lubricating oil sucked into the oil pump from the discharge and suction path to be discharged to the multi-plate clutch mechanism at a time of forward rotation in the four-wheel drive mode.

8. The driving-force transmitting apparatus according to claim 2, wherein the lubricating-oil supply mechanism includes:

an oil pump that is driven on an output side of the multi-plate clutch mechanism; and an opening and closing mechanism that closes a lubricating route in the two-wheel drive mode to stop supply of the lubricating oil and opens the lubricating route to supply the lubricating oil in the four-wheel drive mode.

9. The driving-force transmitting apparatus according to claim 8, wherein the opening and closing mechanism includes:

a valve chamber formed in an internal axial direction of an output shaft from the rear-wheel differential device having the multi-plate clutch mechanism and supplied with the lubricating oil from the oil pump;

a valve member slidably accommodated in the valve chamber and moving in synchronization with a piston movable in an axial direction and disengaging the clutch plates of the multi-plate clutch mechanism; and an oil supply hole for supplying the lubricating oil between the clutch plates of the multi-plate clutch mechanism, wherein the opening and closing mechanism cuts off the lubricating oil by closing the oil supply hole with a movement of the valve member in synchronization with a movement of the piston to a clutch-unfastened position in the two-wheel drive mode, and opens the oil supply hole to supply the lubricating oil with a movement of the valve member in synchronization with a movement of the piston to a position where the clutch plates are fastened in the four-wheel drive mode.

10. The driving-force transmitting apparatus according to claim 8, wherein the opening and closing mechanism includes:

an oil chamber formed in an inner axial direction of an output shaft of the rear-wheel differential device, the oil chamber to which the lubricating oil from the oil pump is supplied;

an outer-perimeter spline with a valley portion wider than a ridge portion formed on an outer perimeter of the output shaft;

an inner hub of the multi-plate clutch mechanism, the inner hub having an inner-perimeter spline formed with a valley portion wider than a ridge portion fitting in the outer-perimeter spline of the output shaft; and a pair of oil supply holes that cuts off the lubricating oil to the multi-plate clutch mechanism at a position where the outer-perimeter spline abuts on the inner-perimeter spline with reverse rotation of the output shaft in the two-wheel drive mode and that supplies the lubricating oil to the multi-plate clutch mechanism at a position where the outer-perimeter spline abuts on the inner-perimeter spline with forward rotation of the output shaft in the four-wheel drive mode, the oil supply holes formed in the valley portions of the outer-perimeter spline and the inner-perimeter spline.

11. The driving-force transmitting apparatus according to claim 3, wherein the drag-torque decreasing mechanism includes a spring member for pressing in a direction of widening a space between the clutch plates.

12. The driving-force transmitting apparatus according to claim 3, wherein the drag-torque decreasing mechanism includes a spring member in a space formed with a piston pressing the clutch plates, the spring member for pressing in a direction of widening the space therebetween.

13. The driving-force transmitting apparatus according to claim 1, wherein the controller fastens the disengaging device after fastening the multi-plate clutch mechanism in switching from the two-wheel drive mode to the four-wheel drive mode, and disconnects the disengaging device after releasing the multi-plate clutch mechanism when switching from the four-wheel drive mode to the two-wheel drive mode.

14. A driving-force transmitting apparatus for a vehicle capable of switching between a four-wheel drive mode in which a driving force is transmitted to front wheels and rear wheels and a two-wheel drive mode in which the driving force is transmitted only to the front wheels, the driving-force transmitting apparatus comprising:

a front-wheel differential device that, upon receiving a driving force from an engine, distributes the driving force to left and right front wheels;

a first driving-force transmitting direction converting unit that changes a rotating direction of the driving force from the engine for transmission to the rear wheels;

a rear-wheel differential device that distributes the driving force to left and right rear wheels;

a second driving-force transmitting direction converting unit that, upon receiving the driving force from the first driving-force transmitting direction converting unit, changes a rotating direction for transmission to the rear-wheel differential device;

a first disengaging mechanism that disengages the driving force to the first driving-force transmitting direction converting unit;

a second disengaging mechanism provided at at least one of a space between the rear-wheel differential device and a rear-wheel left shaft and a space between the rear-wheel differential device and a rear-wheel right shaft to disengage the driving force; and a controller that disconnects the second disengaging mechanism and then disconnects the first disengaging mechanism when switching is made from the four-wheel drive mode to the two-wheel drive mode, and connects the second disengaging mechanism and then connects the first disengaging mechanism when switching is made from the two-wheel drive mode to the four-wheel drive mode, wherein the first disengaging mechanism is an engaging clutch mechanism that switches, with an operation of an actuator, between connection with engagement of a coupling sleeve with a clutch gear and disconnection in which the coupling sleeve is disconnected from the clutch gear, the second disengaging mechanism is a multi-plate clutch mechanism that controls distribution of the driving force to be transmitted to the front wheels and the rear wheels by successively changing a fastening force, and when switching is made from the four-wheel drive mode to the two-wheel drive mode, the controller releases the fastening force of the multi-plate clutch mechanism of the second disengaging mechanism for disconnection, and then sets, as for the first disengaging mechanism, the engaging clutch mechanism as disconnected with an operation of the actuator and, when switching is made from the two-wheel drive mode to the four-wheel drive mode, the controller provides the fastening force to the multi-plate clutch mechanism of the second disengaging mechanism for connection and then connects the first disengaging mechanism with an operation of the actuator.

15. The driving-force transmitting apparatus according to claim 14, wherein
the first disengaging mechanism includes:
a shift rod that is moved by the actuator in a reciprocating manner in a connecting direction and a disconnecting direction of the engaging clutch mechanism;
a fork provided to the shift rod to move integrally with a movement of the shift rod in the disconnecting direction and to become free with a movement of the shift rod in the connecting direction; and
a spring that always presses the fork in the connecting direction, and when switching is made from the four-wheel drive mode to the two-wheel drive mode, with the movement of the shift rod in the disconnecting direction with an operation of the actuator, the fork is integrally moved against the spring to detach the coupling sleeve of the engaging clutch mechanism from the clutch gear for releasing connection and, when switching is made from the two-wheel drive mode to the four-wheel drive mode, with a shifting force being set as free with the movement of the shift rod in the connecting direction with an operation of the actuator, the coupling sleeve of the engaging clutch mechanism is pressed onto an end face of the clutch gear by the spring for connection with engagement at a time of synchronization of rotation of both.

16. The driving-force transmitting apparatus according to claim 14, wherein the actuator that activates the first disengaging mechanism is placed on an upper portion in an orthogonal direction of the first driving-force transmitting direction converting unit placed in the vehicle.

17. The driving-force transmitting apparatus according to claim 14, wherein
drag torque at a time of disconnection of the multi-plate clutch mechanism provided to the second disengaging mechanism is set to be smaller than friction torque from the first driving-force transmitting direction converting unit to the second driving-force transmitting direction converting unit.

18. The driving-force transmitting apparatus according to claim 17, wherein the multi-plate clutch mechanism includes a spring member for pressing in a direction of widening a space between clutch plates.

19. The driving-force transmitting apparatus according to claim 17, wherein the multi-plate clutch mechanism includes a spring member in a space formed with a piston pressing clutch plates, the spring member for pressing in a direction of widening a space between the clutch plates.

20. The driving-force transmitting apparatus according to claim 17, wherein the multi-plate clutch mechanism has a switching valve that operates with a movement of a piston in an axial direction, cuts off supply of oil to clutch plates at a clutch-disconnected position where the piston is refracted, and supplies the oil to the clutch plates at a clutch-fastened position where the piston advances.

* * * * *